United States Patent
Yan et al.

(10) Patent No.: US 12,429,756 B2
(45) Date of Patent: Sep. 30, 2025

(54) LASER PROJECTION APPARATUS

(71) Applicant: Hisense Laser Display Co., Ltd, Qingdao (CN)

(72) Inventors: Ke Yan, Qingdao (CN); Wei Li, Qingdao (CN); Wuyue Han, Qingdao (CN); Youliang Tian, Qingdao (CN)

(73) Assignee: Hisense Laser Display Co., Ltd, Qingdao (CN)

( * ) Notice: Subject to any disclaimer, the term of this patent is extended or adjusted under 35 U.S.C. 154(b) by 402 days.

(21) Appl. No.: 18/083,167

(22) Filed: Dec. 16, 2022

(65) Prior Publication Data

US 2023/0119932 A1    Apr. 20, 2023

Related U.S. Application Data

(63) Continuation of application No. PCT/CN2021/101615, filed on Jun. 22, 2021, and a
(Continued)

(30) Foreign Application Priority Data

Jun. 22, 2020 (CN) .......................... 202010577387.2
Jun. 18, 2021 (CN) .......................... 202110678499.1
Jun. 18, 2021 (CN) .......................... 202110679835.4

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01); *G03B 21/2066* (2013.01); *G03B 21/208* (2013.01)

(58) Field of Classification Search
CPC .............. G03B 21/204; G03B 21/2066; G03B 21/208; G03B 21/2013; G03B 33/08; G02B 26/008; G02B 5/0284; G02B 19/0057
(Continued)

(56) References Cited

U.S. PATENT DOCUMENTS

2007/0297061 A1   12/2007 Kyomoto
2010/0328633 A1   12/2010 Sato et al.
(Continued)

FOREIGN PATENT DOCUMENTS

CN      101052915 A    10/2007
CN      102418907 A     4/2012
(Continued)

OTHER PUBLICATIONS

"Chinese Application Serial No. 202010577387.2, Office Action mailed Apr. 21, 2022", with English Translation, 10 pgs.
(Continued)

*Primary Examiner* — Magda Cruz
(74) *Attorney, Agent, or Firm* — Schwegman Lundberg & Woessner, P.A.

(57) ABSTRACT

A laser projection apparatus includes a laser source, a light modulating engine and a projection lens. The laser source includes a laser device, a combining component, a first lens and a phosphor wheel. The combining component includes a reflecting region and two transmitting regions. The reflecting region is configured to reflect a laser beam and a fluorescent beam incident on the reflecting region. The two transmitting regions are disposed on two sides of the reflecting region respectively, and the transmitting regions are configured to transmit a plurality of laser beams emitted by the laser device. The phosphor wheel includes a first region and a second region. The first region is configured to diffuse and reflect the laser beams incident on the first region. The
(Continued)

second region is configured to be excited to emit a fluorescent beam due to irradiation of the laser beams incident on the second region.

20 Claims, 11 Drawing Sheets

Related U.S. Application Data continuation of application No. PCT/CN2021/101616, filed on Jun. 22, 2021.

(58) Field of Classification Search
USPC .......................................................... 353/98
See application file for complete search history.

(56) References Cited

U.S. PATENT DOCUMENTS

| | | | |
|---|---|---|---|
| 2013/0135593 A1 | 5/2013 | Saitou | |
| 2013/0250546 A1 | 9/2013 | Hu et al. | |
| 2014/0043589 A1 | 2/2014 | Chifu | |
| 2014/0160441 A1 | 6/2014 | Kim et al. | |
| 2014/0218623 A1 | 8/2014 | Kimura et al. | |
| 2014/0254129 A1 | 9/2014 | Miyoshi et al. | |
| 2014/0285774 A1 | 9/2014 | Tajiri | |
| 2015/0036107 A1 | 2/2015 | Nagahara et al. | |
| 2015/0153636 A1 | 6/2015 | Hartwig | |
| 2015/0362830 A1* | 12/2015 | Liao | G03B 21/2066 353/31 |
| 2016/0088273 A1 | 3/2016 | Fukui et al. | |
| 2016/0274353 A1 | 9/2016 | Ando et al. | |
| 2016/0274446 A1 | 9/2016 | Tanaka | |
| 2016/0327851 A1 | 11/2016 | Liao et al. | |
| 2018/0180789 A1 | 6/2018 | Russert et al. | |
| 2019/0353997 A1 | 11/2019 | Hsu et al. | |
| 2020/0103737 A1 | 4/2020 | Kawasumi | |

FOREIGN PATENT DOCUMENTS

| | | |
|---|---|---|
| CN | 102929086 A | 2/2013 |
| CN | 103256567 A | 8/2013 |
| CN | 103869590 A | 6/2014 |
| CN | 103930825 A | 7/2014 |
| CN | 104035266 A | 9/2014 |
| CN | 104698729 A | 6/2015 |
| CN | 104870887 A | 8/2015 |
| CN | 105190432 A | 12/2015 |
| CN | 205176468 U | 4/2016 |
| CN | 105549312 A | 5/2016 |
| CN | 105549313 A | 5/2016 |
| CN | 105607400 A | 5/2016 |
| CN | 106195671 A | 12/2016 |
| CN | 205787562 U | 12/2016 |
| CN | 106324962 A | 1/2017 |
| CN | 205880478 U | 1/2017 |
| CN | 106385739 A | 2/2017 |
| CN | 206594438 U | 10/2017 |
| CN | 107315312 A | 11/2017 |
| CN | 107505807 A | 12/2017 |
| CN | 107561834 A | 1/2018 |
| CN | 107561835 A | 1/2018 |
| CN | 107861324 A | 3/2018 |
| CN | 107885021 A | 4/2018 |
| CN | 108008593 A | 5/2018 |
| CN | 108139066 A | 6/2018 |
| CN | 207473278 U | 6/2018 |
| CN | 207676111 U | 7/2018 |
| CN | 108663884 A | 10/2018 |
| CN | 108803215 A | 11/2018 |
| CN | 208172483 U | 11/2018 |
| CN | 108931879 A | 12/2018 |
| CN | 109375462 A | 2/2019 |
| CN | 109407450 A | 3/2019 |
| CN | 109656084 A | 4/2019 |
| CN | 109991801 A | 7/2019 |
| CN | 110221508 A | 9/2019 |
| CN | 110297384 A | 10/2019 |
| CN | 110543072 A | 12/2019 |
| CN | 110764172 A | 2/2020 |
| CN | 111025833 A | 4/2020 |
| CN | 111176063 A | 5/2020 |
| CN | 111381424 A | 7/2020 |
| CN | 111522188 A | 8/2020 |
| CN | 111522189 A | 8/2020 |
| CN | 212112111 U | 12/2020 |
| CN | 212160327 U | 12/2020 |
| CN | 113050354 A | 6/2021 |
| CN | 113311654 A | 8/2021 |
| JP | 2011075899 A | 4/2011 |
| JP | WO2012035636 A1 | 3/2012 |
| JP | 2012073489 A | 4/2012 |
| JP | 2013120250 A | 6/2013 |
| JP | 2014075221 A | 4/2014 |
| JP | 2016153878 A | 8/2016 |
| JP | 2017037106 A | 2/2017 |
| JP | 2017156403 A | 9/2017 |
| JP | 2020052236 A | 4/2020 |
| WO | WO-2012143990 A1 | 10/2012 |
| WO | WO-2019200980 A1 | 10/2019 |

OTHER PUBLICATIONS

"Chinese Application Serial No. 202110243232.X, Decision of Rejection mailed Nov. 18, 2022", with English Translation, 20 pgs.
"Chinese Application Serial No. 202110243232.X, Office Action mailed May 13, 2022", with English Translation, 16 pgs.
"Chinese Application Serial No. 202110243232.X, Office Action mailed Aug. 18, 2022", with English Translation, 18 pgs.
"Chinese Application Serial No. 202110243232.X, Office Action mailed Dec. 20, 2021", with English Translation, 19 pgs.
"Chinese Application Serial No. 202110678499.1, Notification to Grant Patent Right for Invention mailed Oct. 28, 2022", with English Translation, 9 pgs.
"Chinese Application Serial No. 202110678499.1, Office Action mailed Jan. 6, 2022", with English Translation, 19 pgs.
"Chinese Application Serial No. 202110678499.1, Office Action mailed Jul. 1, 2022", with English Translation, 15 pgs.
"Chinese Application Serial No. 202110679835.4, Notification to Grant Patent Right for Invention mailed Jul. 4, 2022", with English Translation, 9 pgs.
"Chinese Application Serial No. 202110679835.4, Office Action mailed Jan. 6, 2022", with English Translation, 18 pgs.
"International Application Serial No. PCT/CN2021/101564, International Search Report and Written Opinion mailed Sep. 17, 2021", with English Translation, 17 pgs.
"International Application Serial No. PCT/CN2021/101568, International Search Report and Written Opinion mailed Sep. 15, 2021", with English Translation, 16 pgs.
"International Application Serial No. PCT/CN2021/101615, International Search Report and Written Opinion mailed Sep. 27, 2021", with English Translation, 19 pgs.
"International Application Serial No. PCT/CN2021/101616, International Search Report and Written Opinion mailed Sep. 24, 2021", with English translation, 17 pgs.
"U.S. Appl. No. 17/725,868, Notice of Allowance mailed May 23, 2023", 10 pgs.
"Chinese Application Serial No. 202110243232.X, Office Action mailed Apr. 25, 2023", with English translation, 11 pgs.
"Chinese Application Serial No. 202180044674 Office Action Mailed Aug. 3, 2025", With English Translation, 22 pgs.
"Chinese Application Serial No. 202180044674.X Office Action Mailed May 27, 2025", With English Translation, 22 pgs.

* cited by examiner

LASER PROJECTION APPARATUS

CROSS-REFERENCE TO RELATED APPLICATIONS

This application is a continuation application of International Patent Application No. PCT/CN2021/101616, filed on Jun. 22, 2021, which claims priorities to Chinese Patent Application No. 202010577387.2, filed on Jun. 22, 2020, and Chinese Patent Application No. 202110678499.1, filed on Jun. 18, 2021; this application is a continuation application of International Patent Application No. PCT/CN2021/101615, filed on Jun. 22, 2021, which claims priorities to Chinese Patent Application No. 202010577387.2, filed on Jun. 22, 2020, and Chinese Patent Application No. 202110679835.4, filed on Jun. 18, 2021, which are incorporated herein by reference in their entireties.

TECHNICAL FIELD

The present disclosure relates to the field of laser projection technologies, and in particular, to a laser projection apparatus.

BACKGROUND

With the continuous development of science and technology, laser projection apparatuses are increasingly applied in people's work and life, and consumers' demands for the laser projection apparatuses are gradually increasing. In order to achieve the miniaturization of the laser projection apparatus and improve the display effect of the laser projection apparatus, not only basic illumination function should be achieved, but also a volume, cost and optical efficiency should be taken into account in a design of laser source products.

SUMMARY

In an aspect, a laser projection apparatus is provided. The laser projection apparatus includes a laser source, a light modulating engine and a projection lens. The laser source is configured to emit illumination beams. The light modulating engine is configured to modulate the illumination beams, so as to obtain projection beams. The projection lens is configured to project the projection beams into an image. The laser source includes a laser device, a combining component, a first lens and a phosphor wheel. The laser device is configured to emit a plurality of laser beams. The combining component is located on a laser-exit beam path of the laser device and is disposed obliquely with respect to a laser-exit direction of the laser device. The combining component includes a reflecting region and two transmitting regions. The reflecting region is configured to reflect a laser beam and a fluorescent beam incident on the reflecting region. The two transmitting regions are disposed on two sides of the reflecting region respectively, and the transmitting regions are configured to transmit the plurality of laser beams emitted by the laser device. The first lens is located on a side of the combining component away from the laser device, and the first lens is configured to converge the laser beams transmitted by the transmitting regions. The phosphor wheel is located on a side of the first lens away from the combining component, and the phosphor wheel includes a first region and a second region. The first region is configured to diffuse and reflect the laser beams converged by the first lens. The second region is configured to be excited to emit a fluorescent beam due to irradiation of the laser beams converged by the first lens. With a rotation of the phosphor wheel, when the laser beams converged by the first lens are incident on the first region, the first region diffuses and reflects the laser beams incident on the first region, and the laser beams reflected by the first region are incident on the reflecting region of the combining component after passing through the first lens. When the laser beams converged by the first lens are incident on the second region, the second region emits the fluorescent beam due to excitation of the laser beams incident on the second region, and the fluorescent beam is incident on the reflecting region of the combining component after passing through the first lens. The reflecting region of the combining component reflects the laser beam and the fluorescent beam from the phosphor wheel to a beam outlet of the laser source, so as to be the illumination beams of the laser source.

In another aspect, a laser projection apparatus is provided. The laser projection apparatus includes a laser source, a light modulating engine and a projection lens. The laser source is configured to emit illumination beams. The light modulating engine is configured to modulate the illumination beams, so as to obtain projection beams. The projection lens is configured to project the projection beams into an image. The laser source includes a laser device, a combining component, a first lens and a phosphor wheel. The laser device is configured to emit a plurality of laser beams. The combining component is located on a laser-exit beam path of the laser device and is disposed obliquely with respect to a laser-exit direction of the laser device. The combining component includes a plurality of reflecting regions and a plurality of transmitting regions. The plurality of reflecting regions are configured to reflect a laser beam and a fluorescent beam incident on the reflecting regions. The plurality of transmitting regions are configured to transmit the plurality of laser beams emitted by the laser device. The plurality of transmitting regions and the plurality of reflecting regions are arranged alternately. The first lens is located on a side of the combining component away from the laser device. The first lens is configured to converge the plurality of laser beams transmitted by the plurality of transmitting regions. Beam spots provided on the first lens by any two of the plurality of laser beams are asymmetrical with respect to an optical axis of the first lens. The phosphor wheel is located on a side of the first lens away from the combining component, and the phosphor wheel includes a first region and a second region. The first region is configured to diffuse and reflect the laser beams converged by the first lens. The second region is configured to be excited to emit a fluorescent beam due to irradiation of the laser beams converged by the first lens. With a rotation of the phosphor wheel, when the laser beams converged by the first lens are incident on the first region, the first region diffuses and reflects the laser beams incident on the first region, and the laser beam reflected by the first region is incident on the plurality of reflecting regions of the combining component after passing through the first lens. When the laser beams converged by the first lens are incident on the second region, the second region emits the fluorescent beam due to excitation of the laser beams incident on the second region, and the fluorescent beam is incident on the plurality of reflecting regions of the combining component after passing through the first lens. The plurality of reflecting regions of the combining component reflect the laser beam and the fluorescent beam from the phosphor wheel to a beam outlet of the laser source, so as to be the illumination beams of the laser source.

In yet another aspect, a laser projection apparatus is provided. The laser projection apparatus includes a laser source, a light modulating engine and a projection lens. The laser source is configured to emit illumination beams. The light modulating engine is configured to modulate the illumination beams, so as to obtain projection beams. The projection lens is configured to project the projection beams into an image. The laser source includes a laser device, a combining component, a first lens and a phosphor wheel. The laser device is configured to emit a laser beam. The combining component is located on a laser-exit beam path of the laser device and is disposed obliquely with respect to a laser-exit direction of the laser device. The combining component includes two reflecting regions and a transmitting region. The two reflecting regions are configured to reflect a laser beam and a fluorescent beam incident on the reflecting regions. The transmitting region is disposed between the two reflecting regions, and the transmitting region is configured to transmit the laser beam emitted by the laser device. The first lens is located on a side of the combining component away from the laser device, and the first lens is configured to converge the laser beams transmitted by the transmitting regions. The laser beam emitted by the laser device passes through an optical axis of the first lens. The phosphor wheel is located on a side of the first lens away from the combining component, and the phosphor wheel includes a first region and a second region. The first region is configured to diffuse and reflect the laser beam converged by the first lens. The second region is configured to be excited to emit a fluorescent beam due to irradiation of the laser beam converged by the first lens. With a rotation of the phosphor wheel, when the laser beam converged by the first lens is incident on the first region, the first region diffuses and reflects the laser beam incident on the first region, and the laser beam reflected by the first region is incident on the two reflecting regions of the combining component after passing through the first lens. When the laser beam converged by the first lens is incident on the second region, the second region emits the fluorescent beam due to excitation of the laser beam incident on the second region, and the fluorescent beam is incident on the two reflecting regions of the combining component after passing through the first lens. The two reflecting regions of the combining component reflect the laser beam and the fluorescent beam from the phosphor wheel to a beam outlet of the laser source, so as to be the illumination beams of the laser source.

BRIEF DESCRIPTION OF THE DRAWINGS

In order to describe technical solutions in the present disclosure more clearly, the accompanying drawings to be used in some embodiments of the present disclosure will be introduced briefly. However, the accompanying drawings to be described below are merely some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method and an actual timing of a signal to which the embodiments of the present disclosure relate.

DETAILED DESCRIPTION

Figure 1:
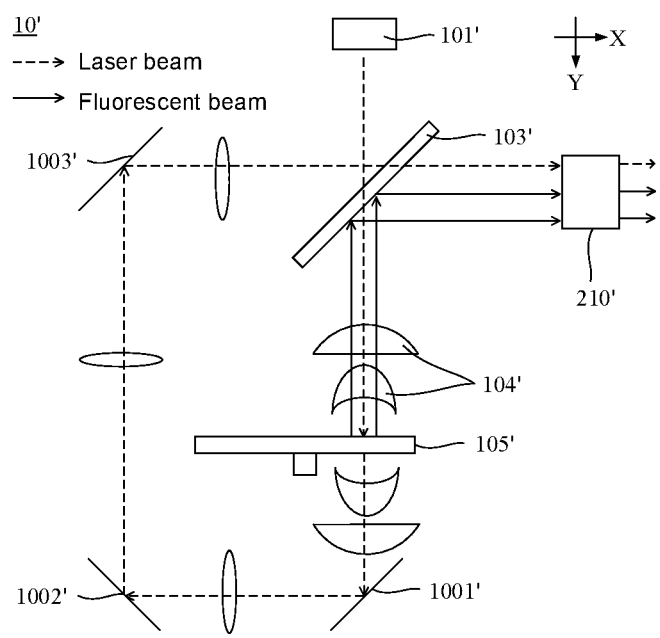
FIG. 1 is a diagram showing a structure of a laser source in the related art.

Some embodiments of the present disclosure will be described clearly and completely with reference to the accompanying drawings below. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Therefore, the features defined by "first" or "second" may explicitly or implicitly include one or more of the features. In the description of the embodiments of the present disclosure, unless otherwise specified, terms such as "a plurality of", "the plurality of" and "multiple" each mean two or more.

In the description of some embodiments, the term "connected" and derivatives thereof may be used. The term "connected" should be understood broadly. For example, it may be a fixed connection, a detachable connection, or an integral connection; and it may be a direct connection, or may be an indirect connection through an intermediate medium.

The phrase "A and/or B" includes following three combinations: only A, only B, and a combination of A and B.

The use of the phrase "applicable to" or "configured to" herein means an open and inclusive expression, which does not exclude devices applicable to or configured to perform additional tasks or steps.

The term such as "about", "substantially" and "approximately" as used herein includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

The term such as "parallel", "perpendicular" and "equal" as used herein include stated conditions and conditions similar to the stated conditions. A range of the similar conditions is within an acceptable deviation range, and the acceptable deviation range is determined by a person of ordinary skill in the art, considering measurement in question and errors associated with the measurement of a particular quantity (i.e., the limitation of a measurement system).

FIG. 1 is a diagram showing a structure of a laser source in the related art.

Generally, as shown in FIG. 1, a laser source 10' includes a laser device 101', a combining component 103', a first lens 104', a phosphor wheel 105', and a relay loop consisting of three reflectors 1001', 1002', and 1003'. The laser device 101' emits a laser beam (e.g., a blue laser beam), and the laser beam may pass through the combining component 103' and the first lens 104' and be incident on the phosphor wheel 105'. The phosphor wheel 105' includes a fluorescence region and a laser-transmitting region. The fluorescence region emits a fluorescent beam (e.g., a red fluorescent beam or a green fluorescent beam) due to irradiation of the laser beam, and the fluorescent beam is reflected by the combining component 103' to a light homogenizing component 210'. The laser beam may pass through the laser-transmitting region, and be reflected to the combining component 103' through the relay loop, and the laser beam is incident on the light homogenizing component 210' together with the fluorescent beam after passing through the combining component 103'.

Since the laser source 10' includes the relay loop, there are many optical elements in the laser source 10', and the laser source 10' has a large volume, which does not facilitate the miniaturization of the laser source 10'.

In order to solve the above problems, some embodiments of the present disclosure provide a laser projection apparatus 1.

Figure 2:
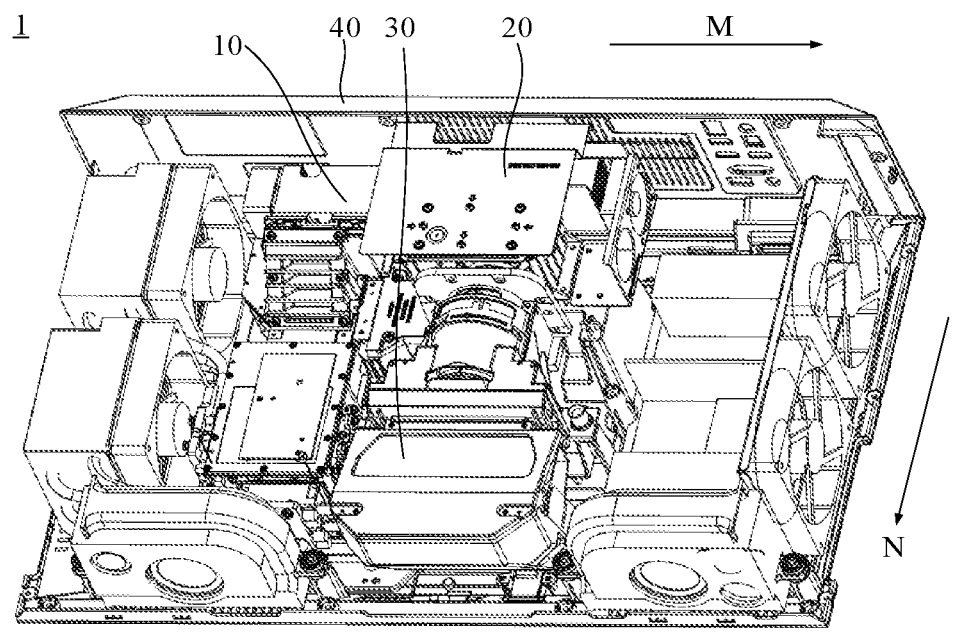
FIG. 2 is a diagram showing a structure of a laser projection apparatus, in accordance with some embodiments.

FIG. 2 is a diagram showing a structure of a laser projection apparatus, in accordance with some embodiments. As shown in FIG. 2, the laser projection apparatus 1 includes an apparatus housing 40 (only a portion of the apparatus housing 40 being shown in FIG. 2), and a laser source 10, a light modulating engine 20 and a projection lens 30 assembled in the apparatus housing 40. The laser source 10 is configured to provide illumination beams (e.g., laser beams). The light modulating engine 20 is configured to modulate the illumination beams provided by the laser source 10 with image signals, so as to obtain projection beams. The projection lens 30 is configured to project the projection beams into an image on a screen or a wall.

The laser source 10, the light modulating engine 20, and the projection lens 30 are sequentially connected in a propagation direction of the beams, and are each wrapped by a corresponding housing. The housings of the laser source 10, the light modulating engine 20 and the projection lens 30 support their corresponding optical components respectively and make the optical components meet certain sealing or airtight requirements.

Figure 3:
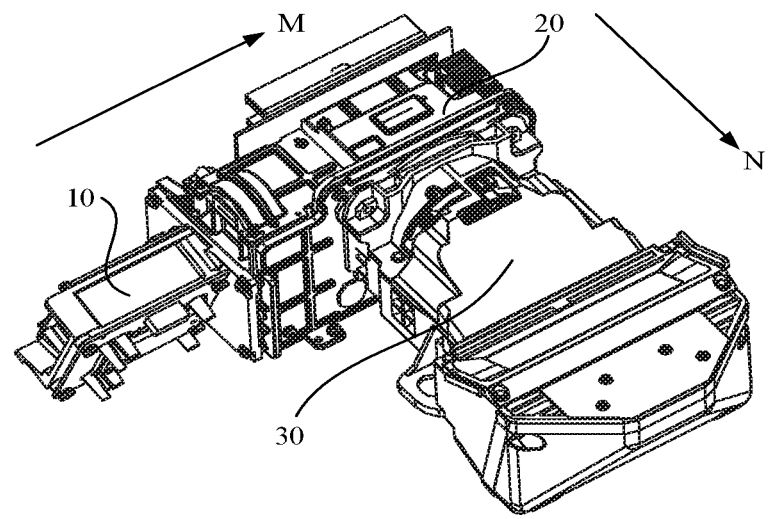
FIG. 3 is a diagram showing a partial structure of a laser projection apparatus, in accordance with some embodiments.

FIG. 3 is a diagram showing a partial structure of a laser projection apparatus, in accordance with some embodiments. As shown in FIG. 3, an end of the light modulating engine 20 is connected to the laser source 10, and the laser source 10 and the light modulating engine 20 are arranged in an exit direction of the illumination beams of the laser projection apparatus 1 (referring to the M direction shown in FIG. 3). Another end of the light modulating engine 20 is connected to the projection lens 30, and the light modulating engine 20 and the projection lens 30 are arranged in an exit direction of the projection beams of the laser projection apparatus 1 (referring to the N direction shown in FIG. 3). The exit direction M of the illumination beams is substantially perpendicular to the exit direction N of the projection beams. In one aspect, such a connection structure may adapt to characteristics of a beam path of a reflective light valve in the light modulating engine 20, and in another aspect, it is also conducive to shortening a length of a beam path in a one-dimensional direction, which is helpful for structural arrangement of the apparatus. For example, in a case where the laser source 10, the light modulating engine 20, and the projection lens 30 are disposed in the one-dimension direction (e.g., the M direction), a length of a beam path in the one-dimensional direction is long, which is not conducive to the structural arrangement of the apparatus. The reflective light valve will be described below.

In some embodiments, the laser source 10 may provide beams of three primary colors sequentially (beams of other colors may also be added on a basis of the beams of three primary colors). However, due to a phenomenon of visual persistence of human eyes, what the human eyes see is white beams formed by mixing the beams of three primary colors. Alternatively, the laser source 10 may also simultaneously output the beams of three primary colors, so as to continuously emit white beams. The laser source 10 includes a laser device. The laser device may emit laser beams of at least one color, such as red laser beams, blue laser beams or green laser beams.

Figure 4:
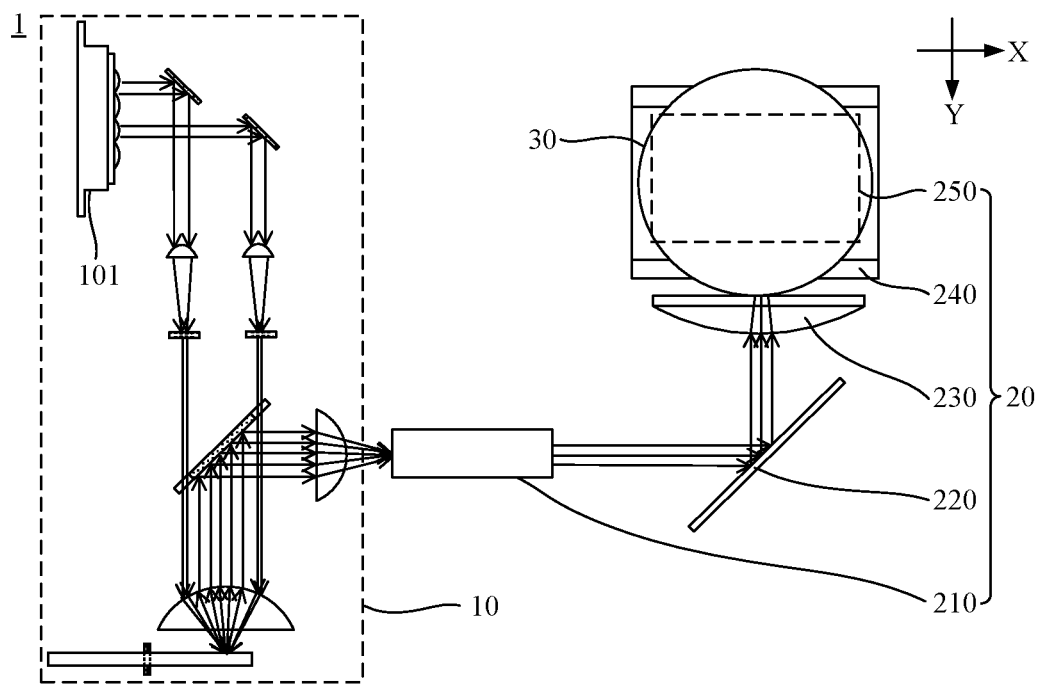
FIG. 4 is a diagram showing a beam path of a laser source, a light modulating engine, and a projection lens in a laser projection apparatus, in accordance with some embodiments.
Figure 5:
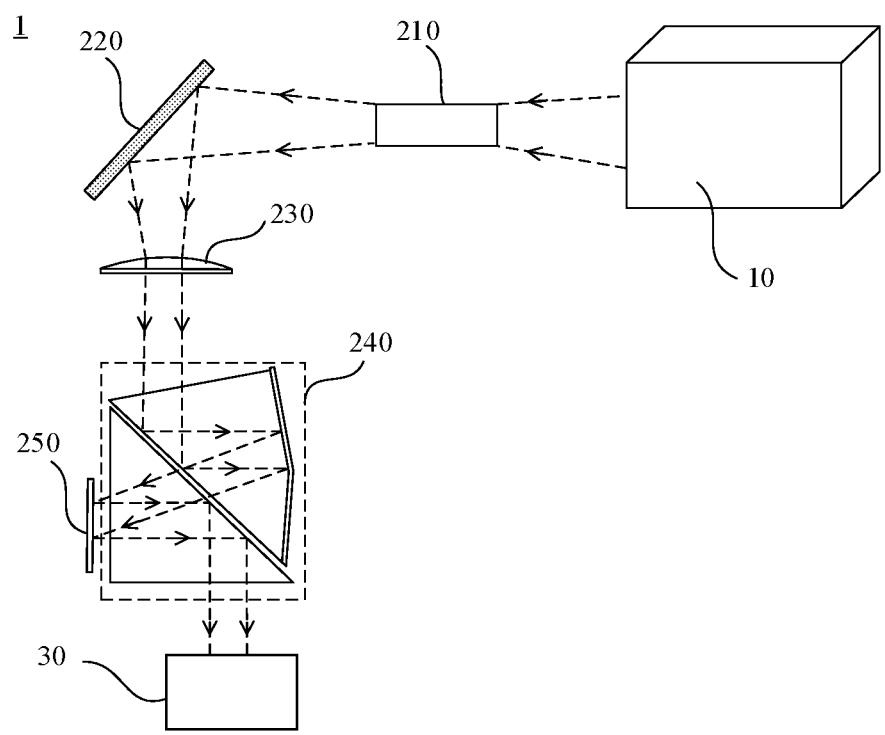
FIG. 5 is a diagram showing another beam path of a laser source, a light modulating engine, and a projection lens in a laser projection apparatus, in accordance with some embodiments.

FIG. 4 is a diagram showing a beam path of a laser source, a light modulating engine, and a projection lens in a laser projection apparatus, in accordance with some embodiments. FIG. 5 is a diagram showing a beam path of another laser source, a light modulating engine, and a projection lens in a laser projection apparatus, in accordance with some embodiments.

The illumination beams emitted by the laser source 10 enter the light modulating engine 20. Referring to FIGS. 4 and 5, the light modulating engine 20 includes a light pipe 210, a reflector 220, a lens assembly 230, a prism assembly 240 and a digital micromirror device (DMD) 250. The light pipe 210 may receive the illumination beams provided by the laser source 10 and homogenize the illumination beams. In addition, a beam outlet of the light pipe 210 may be in a shape of a rectangle, so as to have a shaping effect on a beam spot. The reflector 220 may reflect the illumination beams to the lens assembly 230. The lens assembly 230 may converge the illumination beams to the prism assembly 240. The prism assembly 240 reflects the illumination beams to the digital micromirror device 250, and the digital micromirror device 250 modulates the illumination beams, so as to obtain the projection beams, and reflects the modulated projection beams into the projection lens 30. It will be noted that, the light pipe 210 may be replaced by other components (e.g., a fly-eye lens) with a light homogenizing function.

In the light modulating engine 20, the digital micromirror device 250 modulates the illumination beams provided by the laser source 10 through the image signals. That is, the digital micromirror device 250 controls the projection beams to display different luminance and gray scales according to different pixels of an image to be displayed, so as to finally produce an optical image. Therefore, the digital micromirror device 250 is also referred to as an optical modulator or a light valve. Depending on whether the optical modulator (or the light valve) transmits or reflects the illumination beams, the optical modulator may be classified as a transmissive optical modulator or a reflective optical modulator. For example, the DMD 250 shown in FIG. 5 reflects the illumination beams, and thus it is the reflective optical modulator. A liquid crystal light valve transmits the illumination beams, and thus it is the transmissive optical modulator. In addition, according to the number of the optical modulators used in the light modulating engine 20, the light modulating engine 20 may be classified as a single-chip system, a double-chip system, or a three-chip system. The optical modulators in some embodiments of the present disclosure are digital micromirror devices 250.

Figure 6:
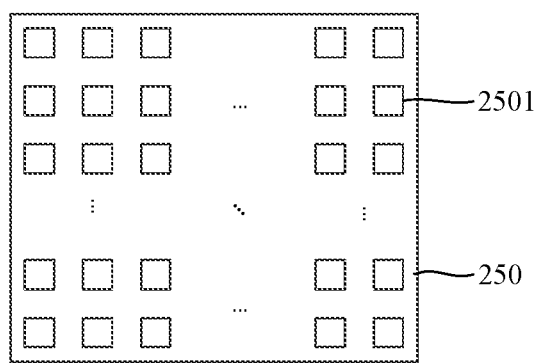
FIG. 6 is a diagram showing an arrangement of micromirrors in a digital micromirror device, in accordance with some embodiments.

FIG. 6 is a diagram showing an arrangement of micromirrors in a digital micromirror device, in accordance with some embodiments.

As shown in FIG. 6, the digital micromirror device 250 includes thousands of micromirrors 2501 that may be individually driven. These micromirrors 2501 are arranged in an array. One micromirror 2501 (e.g., each micromirror 2501) corresponds to one pixel in the projection image to be displayed. The image signals may be converted into digital codes such as 0 or 1 after being processed, and the micromirror 2501 may swing in response to these digital codes. The gray scale of each pixel in one frame of the image is achieved by controlling durations of each micromirror 2501 in an ON and OFF state. In this way, the digital micromirror device 250 may modulate the illumination beams, so as to achieve the display of the projection image. The ON state of the micromirror 2501 is a state that the micromirror 2501 is in and may be maintained when the illumination beams emitted by the laser source 10 may enter the projection lens 30 after being reflected by the micromirror 2501. The OFF state of the micromirror 2501 is a state that the micromirror 2501 is in and may be maintained when the illumination beams emitted by the laser source 10 does not enter the projection lens 30 after being reflected by the micromirror 2501.

Figure 7:
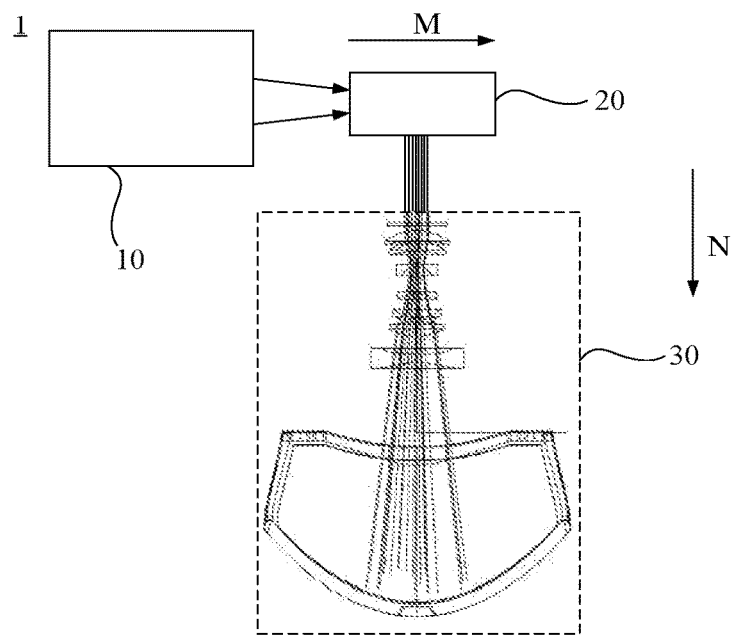
FIG. 7 is a diagram showing yet another beam path of a laser source, a light modulating engine, and a projection lens in a laser projection apparatus, in accordance with some embodiments.

FIG. 7 is a diagram showing yet another beam path of a laser source, a light modulating engine, and a projection lens in a laser projection apparatus, in accordance with some embodiments. In some embodiments, as shown in FIG. 7, the projection lens 30 includes a combination of a plurality of lenses, which are usually divided by group, and are divided into a three-segment combination including a front group, a middle group and a rear group, or a two-segment combination including a front group and a rear group. The front group is a lens group proximate to a laser-exit side of the laser projection apparatus 1 (e.g., a side of the projection lens 30 away from the light modulating engine 20 along the N direction in FIG. 7), and the rear group is a lens group proximate to a laser-exit side of the light modulating engine 20 (e.g., a side of the projection lens 30 proximate to the light modulating engine 20 along the opposite direction of the N direction in FIG. 7). The projection lens 30 may be a zoom projection lens, or a prime focus-adjustable projection lens, or a prime projection lens.

In some embodiments, the laser projection apparatus 1 includes an ultra-short-focus laser projection apparatus, the projection lens 30 includes an ultra-short-focus projection lens. A projection ratio of the projection lens 30 is usually less than 0.3, such as 0.24. In a case of a same projection distance, the smaller the projection ratio, the larger the projection image of the laser projection apparatus 1. The ultra-short-focus projection lens with a small projection ratio is able to adapt to a narrow space while ensuring the projection effect. In this way, the laser projection apparatus 1 may achieve a large-sized projection display with a small projection ratio.

For ease of description, some embodiments of the present disclosure are mainly described by taking an example in which the laser source 10 sequentially outputs the beams of three primary colors, the optical modulator of the light modulating engine 20 is the digital micromirror device 250, and the projection lens 30 is the ultra-short-focus projection lens. However, this should not be construed as a limitation of the present disclosure.

The laser source 10 according to some embodiments of the present disclosure will be described in detail below.

Figure 8:
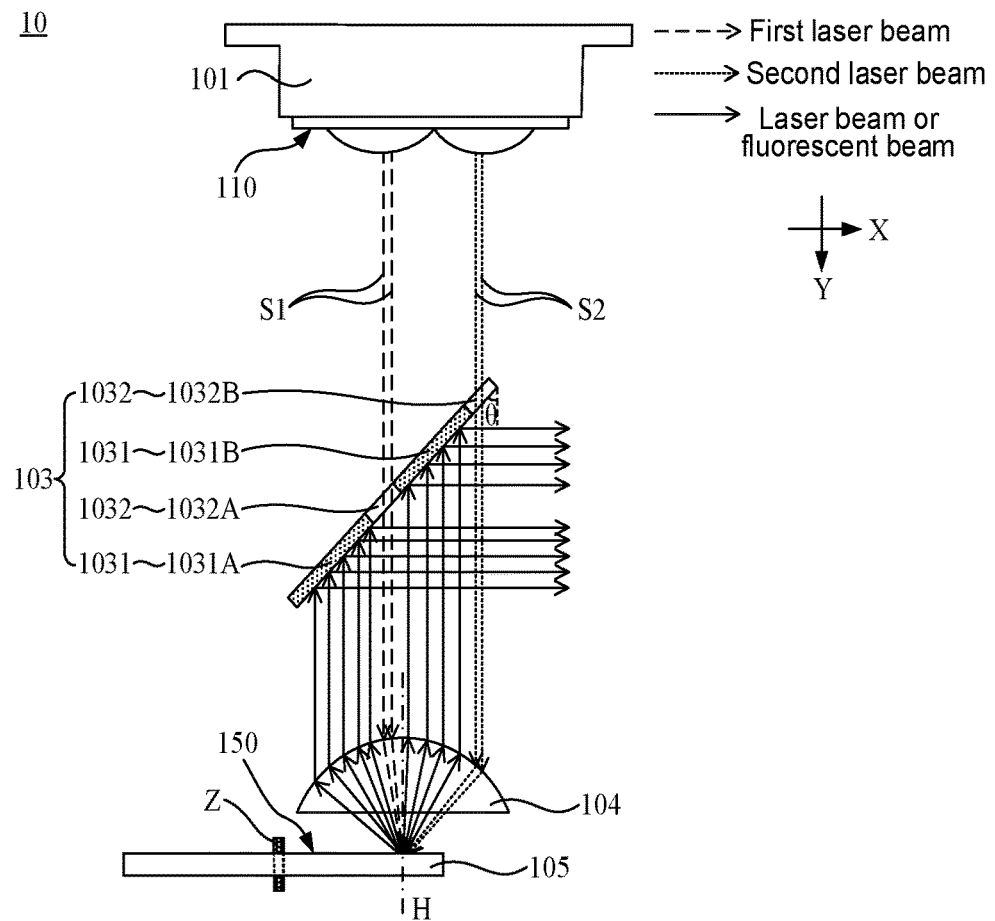
FIG. 8 is a diagram showing a structure of a laser source, in accordance with some embodiments.

FIG. 8 is a diagram showing a structure of a laser source, in accordance with some embodiments.

In some embodiments, as shown in FIG. 8, the laser source 10 includes a laser device 101, a combining component 103, a first lens 104, and a phosphor wheel 105. The laser device 101, the combining component 103, the first lens 104, and the phosphor wheel 105 are arranged sequentially along a second direction Y.

The laser device 101 is configured to emit one or more laser beams. For example, the laser device 101 emits a first laser beam S1 and a second laser beam S2. The combining component 103 is configured to transmit the laser beam emitted by the laser device 101 and reflect the laser beam reflected by the phosphor wheel 105 or the fluorescent beam emitted by the phosphor wheel 105. The first lens 104 is configured to converge the laser beam transmitted by the combining component 103, so as to form a small beam spot on a laser-receiving surface 150 of the phosphor wheel 105. The phosphor wheel 105 is located on a side of the first lens 104 away from the combining component 103, and the phosphor wheel 105 is configured to reflect the laser beam incident on the phosphor wheel 105 and to emit a fluorescent beam due to irradiation of the laser beam incident on the phosphor wheel 105. The laser beam reflected by the phosphor wheel 105 and the fluorescent beam emitted by the phosphor wheel 105 are incident on the combining component 103 through the first lens 104, and exit along a first direction X after being reflected by the combining component 103.

In this way, the laser beam and the fluorescent beam exiting along the first direction X may be combined into the illumination beams of the laser source 10 for use in a subsequent beam path. It will be noted that, the present disclosure is described by taking an example in which the first direction X is perpendicular to the second direction Y. However, the present disclosure is not limited thereto. For example, an angle between the first direction X and the second direction Y may be an obtuse angle or an acute angle.

In some embodiments, the laser source 10 may include one laser device 101 or a plurality of laser devices 101. For example, in a case where the laser source 10 includes one laser device 101, the first laser beam S1 and the second laser beam S2 are two portions of one beam. Alternatively, the first laser beam S1 and the second laser beam S2 are two separate beams emitted by different light-emitting regions of the laser device 101. For another example, in a case where the laser source 10 includes two laser devices 101, the first laser beam S1 and the second laser beam S2 may be emitted by the two laser device 101 respectively.

It will be noted that, the laser device 101 may also emit three, four or more laser beams. The first laser beam S1 and the second laser beam S2 may be any two of the plurality of laser beams. For a case where the laser device 101 emits other number of laser beams, reference may be made to the description of the first laser beam S1 and the second laser beam S2, and details will not be repeated herein.

In some embodiments, the laser device 101 may be a multi-chip laser diode (MCL) device. The MCL device may include a plurality of light-emitting chips arranged in an array and encapsulated in a same tube shell, and each light-emitting chip may independently emit a laser beam, and may emit the laser beam at the same time or at different times as other light-emitting chips. The first laser beam S1 and the second laser beam S2 are emitted by different light-emitting regions of the laser device 101 respectively. For example, the first laser beam S1 and the second laser beam S2 are emitted by different light-emitting chips in the laser device 101 respectively.

In some embodiments, the plurality of light-emitting chips in the laser device 101 may emit the laser beams at the same time. In this case, the plurality of light-emitting chips in the laser device 101 emit the laser beams simultaneously, the laser beams emitted by the laser device 101 are thick and have high luminance. Moreover, luminance of the laser beams after passing through each optical element in the laser source 10 is also high, so as to excite the phosphor wheel 105 to emit the fluorescent beam with high luminance. Thus, luminance of the image obtained when the laser projection apparatus 1 performs projection is high, which improves the display effect of laser projection apparatus 1.

However, the plurality of light-emitting chips in the laser device 101 may emit the laser beams at different times. For example, the plurality of light-emitting chips include first light-emitting chips and second light-emitting chips. The first light-emitting chips and the second light-emitting chips emit the laser beams alternately. In this case, since only a part of the light-emitting chips in the laser device 101 emits the laser beams at the same time, the beam of the laser beams emitted by the laser device 101 is thin, and the beam of the laser beams is also thin after passing through the optical elements in the laser source 10. In this way, all laser beams passing through each of the optical elements may exit from a beam outlet of the laser source 10, so as to avoid the waste of the laser beams, and increase a utilization rate of the laser beams. In addition, since there is no need for the light-emitting chips in the laser device 101 to emit the laser beams continuously, the light-emitting chips may be powered by a pulse current, and energy of the pulse current is high, so that the light-emitting chips may emit the laser beams with high luminance. Moreover, there is no need for the light-emitting chips to emit the laser beams continuously, which improves a service life of the light-emitting chips in the laser device 101.

As shown in FIG. 8, the combining component 103 is located on a laser-exit beam path of the laser device 101, and is disposed obliquely with respect to a laser-exit direction (e.g., the second direction Y in FIG. 8) of the laser device 101. For example, an angle θ between the laser-exit direction of the laser device 101 and the combining component 103 is an acute angle. In this way, the combining component 103 may reflect the laser beam and the fluorescent beam incident on the combining component 103 along the first direction X.

In some embodiments, as shown in FIG. 8, the combining component 103 includes a reflecting region 1031 and a transmitting region 1032. The reflecting region 1031 is configured to reflect the laser beam and the fluorescent beam incident on the reflecting region 1031. The transmitting region 1032 is configured to transmit the laser beam emitted by the laser device 101. It will be noted that, the some embodiments of the present disclosure are mainly described by taking an example in which one laser beam corresponding to one transmitting region 1032. However, one transmitting region 1032 may also correspond to a plurality of laser beams. For example, the plurality of laser beams emitted by the laser device 101 are incident on a same transmitting region 1032.

In some embodiments, the combining component 103 may include a plurality of reflecting regions 1031 and a plurality of transmitting regions 1032, and the plurality of reflecting regions 1031 and the plurality of transmission regions 1032 are arranged alternately. For example, as shown in FIG. 8, the combining component 103 includes a first reflecting region 1031A, a second reflecting region 1031B, a first transmitting region 1032A and a second transmitting region 1032B. The first reflecting region 1031A, the first transmitting region 1032A, the second reflecting region 1031B and the second transmitting region 1032B are arranged alternately. The first reflecting region 1031A is proximate to the phosphor wheel 105 and the second transmitting region 1032B is away from the phosphor wheel 105 and proximate to the laser device 101. The first laser beam S1 and the second laser beam S2 emitted by the laser device 101 are incident on the first transmitting region 1032A and the second transmitting region 1032B respectively.

In some embodiments, beam spots formed on the first lens 104 by any two of the plurality of laser beams transmitted through the plurality of transmitting regions 1032 are asymmetric with respect to an optical axis H of the first lens 104.

Moreover, the plurality of laser beams do not pass through the optical axis H of the first lens 104.

For example, as shown in FIG. 8, the first laser beam S1 and the second laser beam S2 emitted by the laser device 101 are incident on the first transmitting region 1032A and the second transmitting region 1032B respectively. The first laser beam S1 is incident on the first lens 104 after passing through the first transmitting region 1032A. The second laser beam S2 is incident on the first lens 104 after passing through the second transmitting region 10326. The beam spot formed on the first lens 104 by the first laser beam S1 is asymmetric with the beam spot formed on the first lens 104 by the second laser beam S2 with respect to the optical axis H of the first lens 104. That is, a position of the first lens 104 where the first laser beam S1 irradiates on and a position of the first lens 104 where the second laser beam S2 irradiates on are asymmetrical with respect to the optical axis H of the first lens 104. In FIG. 8, the first laser beam S1 is closer to the optical axis H of the first lens 104 than the second laser beam S2. Of course, in some embodiments, a position of any point of the beam spot formed on the first lens 104 by the first laser beam S1 and a position of any point of the beam spot formed on the first lens 104 by the second laser beam S2 may also be asymmetric with respect to the optical axis H of the first lens 104.

In this way, according to the law of reflection, a reflection beam path of the first laser beam S1 after being reflected by the phosphor wheel 105 does not overlap with a reflection beam path of the second laser beam S2 after being reflected by the phosphor wheel 105, and the reflection beam path of the first laser beam S1 does not overlap with an incident beam path of the second laser beam S2, and the reflection beam path of the second laser beam S2 does not overlap with an incident beam path of the first laser beam S1. As a result, it is possible to avoid a phenomenon that the laser beam transmitted from one transmitting region 1032 is transmitted through another transmitting region 1032 after being reflected by the phosphor wheel 105, so that a large portion of the laser beam reflected by the phosphor wheel 105 may be incident on the reflecting region 1031 of the combining component 103, and reflected by the reflecting region 1031 to the beam outlet of the laser source 10, and the utilization rate of the laser beam may be increased.

In some embodiments, an area of the transmitting region 1032 may be less than an area of the reflecting region 1031. For example, a total area of all transmitting regions 1032 of the combining component 103 is less than a total area of all reflecting regions 1031 of the combining component 103. Alternatively, the area of each transmitting region 1032 is less than the area of a reflecting region 1031 adjacent to the transmission region 1032. Alternatively, the area of each transmitting region 1032 is less than the area of each reflecting region 1031.

In some embodiments, the area of the transmitting region 1032 may be less than or equal to one-fourth of the area of the reflecting region 1031.

It will be noted that, the area of the transmitting region 1032 of the combining component 103 only needs to be sufficient to allow the laser beam incident on the transmitting region 1032 to pass through. In this way, by reducing the area of the transmitting region 1032, it is possible to reduce a loss of the laser beam and the fluorescent beam from the phosphor wheel 105 when being transmitted through the transmitting region 1032, and increase the utilization rate of the laser beam and the fluorescent beam.

In some embodiments, the reflecting region 1031 of the combining component 103 is configured to reflect the laser beams or the fluorescent beams of all colors. For example, the combining component 103 includes a reflecting portion (e.g., a reflector), the reflecting portion is located in the reflecting region 1031 and is used to reflect the laser beams or the fluorescent beams of all colors.

In some embodiments, the transmitting region 1032 of the combining component 103 is configured to transmit the laser beam emitted by the laser device 101 and reflect the fluorescent beam emitted by the phosphor wheel 105. For example, the combining component 103 includes a transmitting portion (e.g., a dichroic mirror), and the transmitting portion is located in the transmitting region 1032 and is used to transmit the laser beam emitted by the laser device 101 and reflect the fluorescent beam from the phosphor wheel 105.

Since the fluorescent beam emitted by the phosphor wheel 105 is not only incident on the reflecting region 1031 of the combining component 103 but also incident on the transmitting region 1032 of the combining component 103, and a part of the fluorescent beam is transmitted through the transmitting region 1032 resulting in a loss of the fluorescent beam. Therefore, in order to increase the utilization rate of the fluorescent beam, the transmitting region 1032 is further configured to reflect the fluorescent beam emitted by the phosphor wheel 105. For example, in a case where the laser device 101 emits a blue laser beam, the transmitting region 1032 may transmit the blue laser beam and reflect a red fluorescent beam and a green fluorescent beam. In this way, the fluorescent beam emitted by the phosphor wheel 105 may be reflected by the transmitting region 1032 of the combining component 103 to the beam outlet of the laser source 10, so as to form the projection image, so that the utilization rate of the fluorescent beam is increased. However, the transmitting region 1032 may also reflect a laser beam or a fluorescent beam of a different color than the laser beam emitted by the laser device 101. Alternatively, the transmitting region 1032 may transmit the laser beams or the fluorescent beams of all colors.

Figure 9:
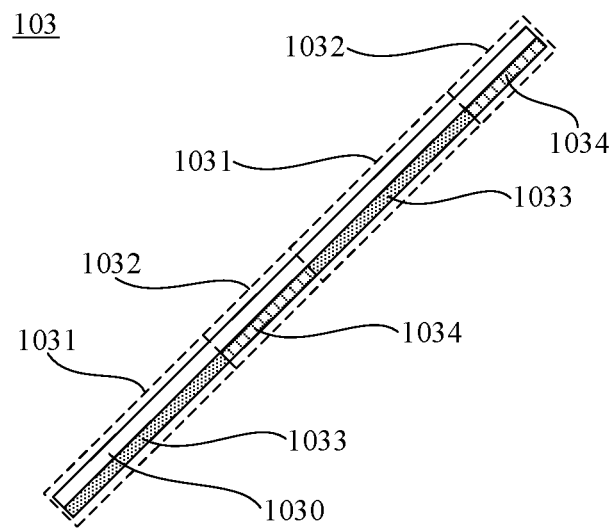
FIG. 9 is a diagram showing a structure of a combining component, in accordance with some embodiments.

FIG. 9 is a diagram showing a structure of a combining component, in accordance with some embodiments.

In some embodiments, as shown in FIG. 9, the combining component 103 includes a second substrate 1030, a first coating film 1033 and a second coating film 1034. The second substrate 1030 may be a transparent substrate. The first coating film 1033 is disposed on a surface of the second substrate 1030 located in the reflecting region 1031. For example, the first coating film 1033 is disposed on a surface of the second substrate 1030 proximate to or away from the first lens 104. The first coating film 1033 may be a reflecting film for all wavelength ranges. Alternatively, the first coating film 1033 may be a reflecting film for at least one of the wavelength range of red light, the wavelength range of green light, or the wavelength range of blue light.

The second coating film 1034 is disposed on a surface of the second substrate 1030 located in the transmitting region 1032. For example, the second coating film 1034 is disposed on a surface of the second substrate 1030 proximate to or away from the first lens 104. The second coating film 1034 is configured to transmit blue light and reflect at least one of red light, yellow light, or green light.

In some embodiments, a portion of the second substrate 1030 corresponding to the reflecting region 1031 of the combining component 103 is a reflecting material member. A portion of the second substrate 1030 corresponding to the transmitting region 1032 of the combining component 103 is a dichroic material member (e.g., a dichroic mirror). In this case, there is no need to provide the first coating film 1033 and the second coating film 1034.

Figure 10:
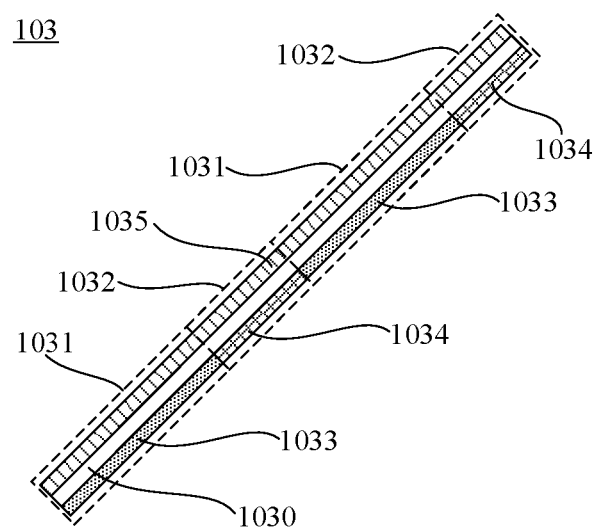
FIG. 10 is a diagram showing a structure of another combining component, in accordance with some embodiments.

FIG. 10 is a diagram showing a structure of another combining component, in accordance with some embodiments.

In some embodiments, as shown in FIG. 10, the combining component 103 further includes an anti-reflection film 1035, and the anti-reflecting coating film 1035 is configured to increase transmittance of the laser beam incident on the anti-reflection film 1035. The anti-reflection film 1035 is disposed on a surface of the second substrate 1030 proximate to the laser device 101. Alternatively, the anti-reflection film 1035 is disposed in the transmitting region 1032 and is located on a surface of the second substrate 1030 proximate to the laser device 101. The anti-reflection film 1035 may increase transmittance of light of a full spectrum. Alternatively, the anti-reflection film 1035 may only increase transmittance of the laser beam (e.g., the blue laser beam) emitted by laser device 101. In this way, it is possible to increase transmittance of the transmitting region 1032 for the laser beam emitted by the laser device 101, so as to reduce a loss of the laser beam, and increase the utilization rate of the laser beam.

In some embodiments, the combining component 103 further includes a light diffusion structure. The light diffusion structure is disposed on a surface of the combining component 103 proximate to the laser device 101. The light diffusion structure is configured to diffuse the laser beam to be incident on the combining component 103, so as to improve the uniformity of the laser beam transmitted through the combining component 103. In this way, when the laser beam irradiates on the phosphor wheel 105, the energy distribution of the fluorescent beam emitted by the phosphor wheel 105 due to excitation of the laser beam is uniform.

For example, the light diffusion structure includes a diffuser. Alternatively, the light diffusion structure includes a structure consisting of a plurality of micro prisms (e.g., a prisms in a shape of a trapezoid, a triangular prism, or a right angle prism). Alternatively, the light diffusion structure includes a structure consisting of a plurality of protrusions parallel to each other and in a shape of a stripe.

In some embodiments of the present disclosure, the description is given mainly by taking an example in which the number of the laser beams from the laser device 101 and incident on the combining component 103 is equal to the number of the transmitting regions 1032 of the combining component 103, and the number of the transmitting regions 1032 of the combining component 103 is equal to the number of the reflecting regions 1031 of the combining component 103. However, the number of the transmitting regions 1032 or the reflection regions 1031 of the combining component 103 may also be greater than the number of the laser beams emitted by the laser device 101, so that an orthogonal projection of the combining component 103 on the phosphor wheel 105 may cover an orthogonal projection of the first lens 104 on the phosphor wheel 105. For example, in a case where the laser device 101 emits two laser beams, on a basis of the combining component 103 shown in FIG. 8, a reflecting region 1031 may also be provided on a side of the second transmitting region 10326 proximate to the laser device 101. As a result, the laser beam and the fluorescent beam exiting from the first lens 104 are reflected by the reflecting regions 1031 of the combining component 103 to the beam outlet of the laser source 10 to a maximum extent, so as to increase the utilization rate of the laser beam and the fluorescent beam.

The above description is given mainly by taking an example in which a laser-exit surface 110 of the laser device 101 is parallel to the laser-receiving surface 150 of the phosphor wheel 105, and the laser device 101 emits the plurality of laser beams directly to the combining component 103. However, in some embodiments, the laser-exit surface 110 of the laser device 101 may also be perpendicular to the laser-receiving surface 150 of the phosphor wheel 105.

Figure 11:
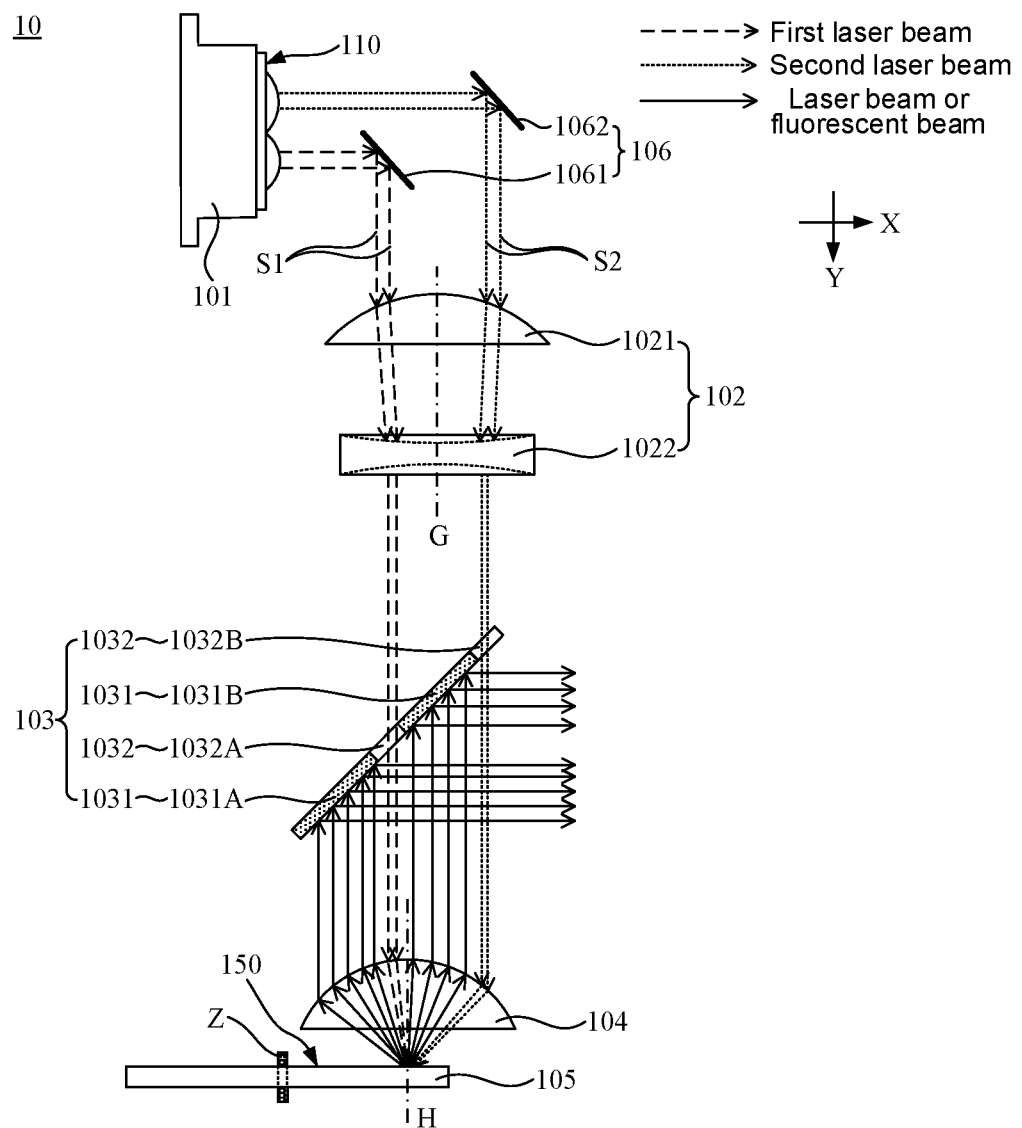
FIG. 11 is a diagram showing a structure of another laser source, in accordance with some embodiments.

FIG. 11 is a diagram showing a structure of another laser source, in accordance with some embodiments.

In some embodiments, as shown in FIG. 11, the laser source 10 further includes a mirror group 106. The mirror group 106 is located on a laser-exit side of the laser device 101, and is configured to reflect the laser beam emitted by the laser device 101 to the combining component 103. The laser device 101 and the mirror group 106 are sequentially arranged along the first direction X, and the mirror group 106, the combining component 103, the first lens 104 and the phosphor wheel 105 are sequentially arranged along the second direction Y.

Figure 17:
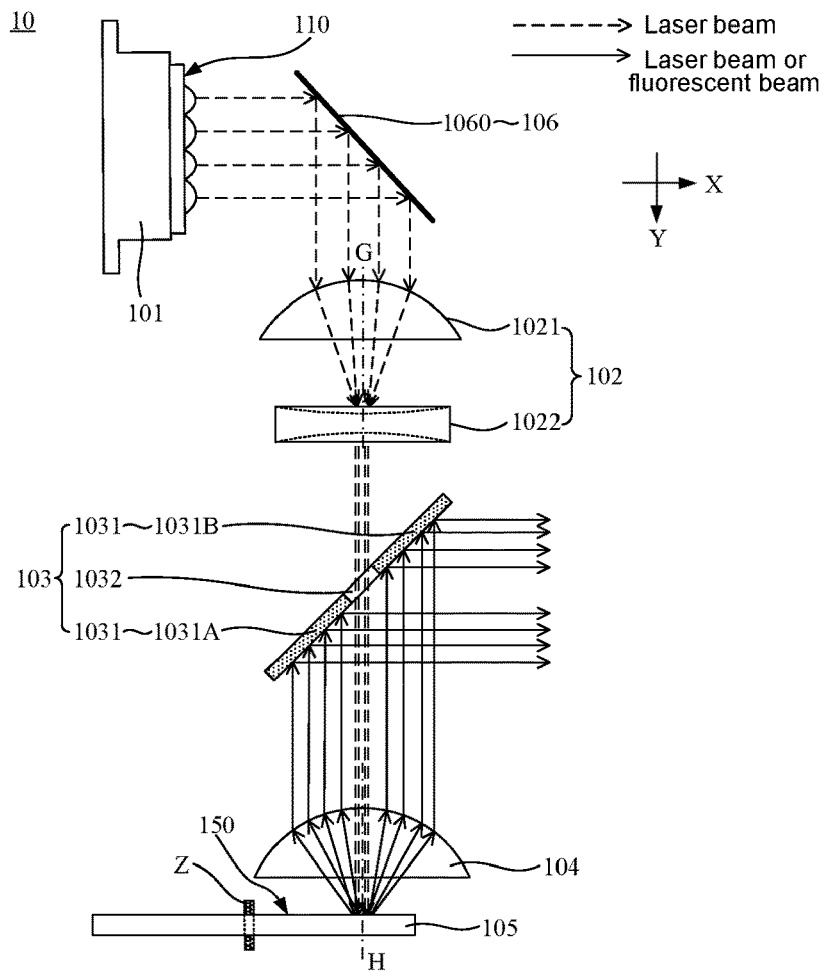
FIG. 17 is a diagram showing a structure of yet another laser source, in accordance with some embodiments.

In some embodiments, the mirror group 106 includes one mirror 1060 (e.g., a reflector), and the mirror 1060 is configured to change a propagation direction of the laser beam emitted by the laser device 101, so that the laser beam emitted by the laser device 101 may be incident on a corresponding transmitting region 1032. For example, as shown in FIG. 17, in a case where the combining component 103 includes one transmitting region 1032, the laser beam emitted by the laser device 101 is incident on the mirror 1060 along the first direction X, and is reflected by the mirror 1060 to the transmitting region 1032 along the second direction Y.

In some embodiments, the mirror group 106 includes a plurality of mirrors, and the plurality of mirrors are configured to split the laser beam emitted by the laser device 101, so as to split the laser beam into a plurality of laser beams, and the plurality of laser beams correspond to the plurality of transmitting regions 1032, and a distance between the obtained split laser beams may be adjusted through adjusting a position of each mirror.

For example, as shown in FIG. 11, the plurality of mirrors include a first mirror 1061 and a second mirror 1062. In a case where the laser device 101 emits one laser beam, the first mirror 1061 and the second mirror 1062 each are configured to reflect different portions of the one laser beam emitted by the laser device 101, so as to form the first laser beam S1 and the second laser beam S2. Of course, the first laser beam S1 and the second laser beam S2 may also be formed by reflecting a plurality of laser beams emitted by one laser device 101 or a plurality of laser devices 101 through the first mirror 1061 and the second mirror 1062, and the present disclosure is not limited thereto.

As shown in FIG. 11, the greater a distance between the first mirror 1061 and the second mirror 1062 in a laser-exit direction (e.g., the first direction X in FIG. 11) of the laser device 101, the greater a distance between the two laser beams obtained by splitting the laser beam emitted by the laser device 101 through the first mirror 1061 and the second mirror 1062. Therefore, the distances between the laser beams exiting from the mirrors may be adjusted by adjusting the distance between the first mirror 1061 and the second mirror 1062 in the laser-exit direction of the laser device 101.

It will be noted that, the number of the plurality of laser beams split by the mirror group 106 corresponds to the number of the plurality of transmitting regions 1032, and the plurality of split laser beams are incident on the plurality of transmitting regions 1032, respectively.

In some embodiments, distances between each of the plurality of mirrors and the laser-exit surface 110 of the laser device 101 are not equal to each other. A distance between each mirror and the laser-exit surface 110 of the laser device 101 includes a minimum distance between any point on a surface of each mirror proximate to the laser device 101 and the laser-exit surface 110 of the laser device 101.

The plurality of mirrors satisfy that, in any two of the plurality of mirrors, at least a portion of an orthogonal projection of one mirror on the laser-exit surface 110 of the laser device 101 does not overlap with at least a portion of an orthogonal projection of another mirror on the laser-exit surface 110 of the laser device 101. Moreover, the minimum distance between one mirror and the laser-exit surface 110 of the laser device 101 is greater than a maximum distance between another mirror and the laser-exit surface 110 of the laser device 101. In this way, a distance between any point on a surface of each mirror proximate to the laser device 101 and the laser-exit surface 110 of the laser device 101 is not equal to a distance between any point on a surface of other mirror proximate to the laser device 101 and the laser-exit surface 110 of the laser device 101.

In some embodiments, at least a surface of the mirror facing toward the laser-exit surface 110 of the laser device 101 is a reflective surface.

For example, both surfaces of the mirrors are reflective surfaces. Alternatively, only the surface of the mirror facing toward the laser-exit surface 110 of the laser device 101 is a reflective surface.

It will be noted that, FIG. 11 is illustrated by taking an example in which the mirror group 106 includes two mirrors, and the two mirrors split the laser beam emitted by the laser device 101 into two laser beams incident on two transmitting regions 1032 respectively. However, the mirror group 106 may also include three, four or more mirrors, so as to split the laser beam emitted by the laser device 101 into three, four or more laser beams, so that the plurality of laser beams split by the mirror group 106 each are incident on the plurality of transmitting regions 1032 or a same transmitting region 1032.

As shown in FIG. 8, the first lens 104 is located between the combining component 103 and the phosphor wheel 105. The first lens 104 is configured to converge the laser beam, so as to form a small beam spot on the laser-receiving surface 150 of the phosphor wheel 105. For example, the first lens 104 is located on a side of the combining component 103 away from the laser device 101. The first lens 104 is further configured to collimate the laser beam reflected by the phosphor wheel 105 and the fluorescent beam emitted by the phosphor wheel 105, so that the laser beam reflected by the phosphor wheel 105 and the fluorescent beam emitted by the phosphor wheel 105 may be incident on the combining component 103 in a form of approximately parallel beam. The first lens 104 includes a convex lens, and a convex arc surface of the convex lens protrudes toward the combining component 103.

In some embodiments, the first lens 104 may include a plurality of convex lenses, and the plurality of convex lenses may be sequentially arranged along an arrangement direction of the combining component 103 and the phosphor wheel 105, and optical axes of the plurality of convex lenses are collinear. In this way, it is possible to improve a converging effect of the first lens 104, so that the laser beam incident on the first lens 104 may be accurately converged on the phosphor wheel 105, and the laser beam reflected by the phosphor wheel 105 and the fluorescent beam emitted by the phosphor wheel 105 may be accurately incident on the combining component 103. It will be noted that, the disclosure is described mainly by taking an example in which the first lens 104 includes one convex lens. However, the present disclosure is not limited thereto.

Figure 12:
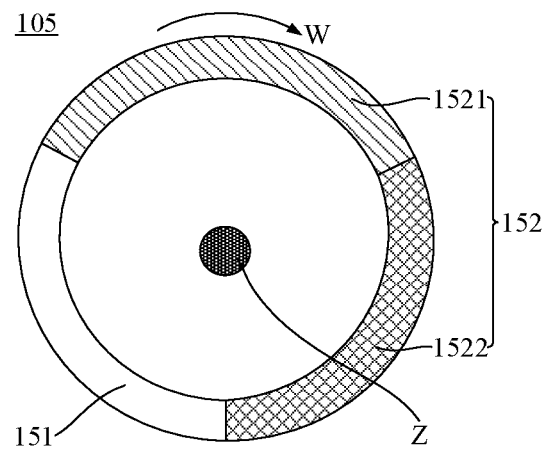
FIG. 12 is a diagram showing a structure of a phosphor wheel, in accordance with some embodiments.
Figure 13:
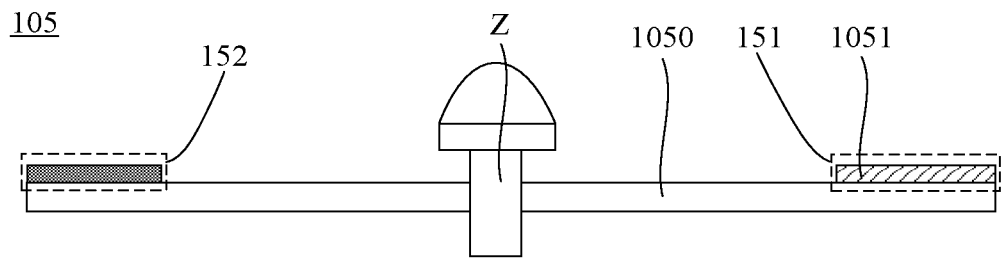
FIG. 13 is a diagram showing a structure of another phosphor wheel, in accordance with some embodiments.

FIG. 12 is a diagram showing a structure of a phosphor wheel, in accordance with some embodiments. FIG. 13 is a diagram showing a structure of another phosphor wheel, in accordance with some embodiments.

In some embodiments, as shown in FIG. 12, the phosphor wheel 105 includes a first region 151 and a second region 152. The first region 151 and the second region 152 are enclosed to form a closed-loop shape (e.g., a ring). The first region 151 is configured to diffuse and reflect the laser beam incident on the first region 151. The second region 152 is configured to be excited to emit fluorescent beam due to irradiation of the laser beam incident on the second region 152. It will be noted that, a color of the fluorescent beam emitted by the phosphor wheel 105 is different from a color of the laser beam emitted by the laser device 101.

For example, as shown in FIG. 13, the phosphor wheel 105 includes a first substrate 1050 and a laser diffusion portion 1051. The first substrate 1050 may be a reflective substrate. A surface of the reflective substrate corresponding to the second region 152 is provided with a fluorescent material (e.g., phosphor powder), and a fluorescent material of one color may be excited to emit a fluorescent beam of the one color. For example, when the laser beam is incident on the second region 152, the laser beam may excite the phosphor powder in the second region 152 to emit a fluorescent beam of the corresponding color, and the fluorescent beam is reflected to the first lens 104 by the reflective substrate. The laser diffusion portion 1051 is disposed in the first region 151 and is located on a surface of the first substrate 1050 proximate to the first lens 104, so as to diffuse the laser beam incident on the first region 151. For example, when the laser beam is incident on the first region 151, the laser beam may be diffused by the laser diffusion portion 1051, and the diffused laser beam is reflected by the reflective substrate to the first lens 104.

However, the first substrate 1050 of the phosphor wheel 105 may also be a non-reflective substrate. For example, the first substrate 1050 includes a ceramic substrate, and the ceramic substrate may be provided with a reflective film layer. In some embodiments, different regions of a surface of the reflective film layer of the first substrate 1050 are coated with the fluorescent material. A region of the reflective film layer coated with the fluorescent material forms the second region 152 of the phosphor wheel 105. A region of the reflective film layer not coated with the fluorescent material forms the first region 151 of the phosphor wheel 105. The laser diffusion portion 1051 is disposed in the first region 151.

In some embodiments, the laser diffusion portion 1051 may include a component with a rough surface. For example, the laser diffusion portion 1051 includes a diffusion sheet or a diffuse reflection body. The diffuse reflection body may include a diffuse reflection coating layer or a diffuse reflection plate. The diffusion sheet is disposed on a surface of the reflective substrate located in the first region 151. Alternatively, a surface of the reflective substrate located in the first region 151 is coated with the diffuse reflection coating layer, so as to form the laser diffusion portion 1051. It will be noted that, since the diffuse reflection body may directly reflect the laser beams incident on the diffuse reflection body, if the laser diffusion portion 1051 is the diffuse reflection body, a portion of the first substrate 1050 corresponding to the first region 151 may not have a reflection function.

In some embodiments, as shown in FIG. 8, the laser source 10 further includes a rotating shaft Z. The phosphor wheel 105 may rotate around the rotating shaft Z, and the rotating shaft Z is parallel to the second direction Y. For example, as shown in FIGS. 12 and 13, the phosphor wheel 105 is in a shape of a circular ring. The rotating shaft Z passes through a center of the circular ring and is perpendicular to the laser-receiving surface 150 of the phosphor wheel 105. The phosphor wheel 105 may rotate around the rotating shaft Z in a W direction or an opposite direction of the W direction. During the rotation of the phosphor wheel 105, the laser beam from the combining component 103 is converged by the first lens 104 and then may irradiate on different regions (e.g., the first region 151 or the second region 152) of the phosphor wheel 105.

When the laser beam is incident on the first region 151, the first region 151 diffuses and reflects the laser beam, and the laser beam reflected by the first region 151 is incident on the combining component 103 after passing through the first lens 104. When the laser beam is incident on the second region 152, the second region 152 is excited by the laser beam, so as to emit the fluorescent beam, and the fluorescent beam is incident on the combining component 103 after passing through the first lens 104.

In some embodiments, a side of the phosphor wheel 105 away from the first lens 104 is opaque to light. In a case where the second region 152 of the phosphor wheel 105 emits the fluorescent beam, the fluorescent beam exits in various directions in a form of Lambert body. By making the side of the phosphor wheel 105 away from the first lens 104 opaque, a light-emitting angle of the second region 152 may be made substantially within a range of 0° to 180° inclusive. In this way, a beam spot provided by the fluorescent beam emitted by the second region 152 may substantially cover a surface of the first lens 104 proximate to the phosphor wheel 105. The Lambert body may refer to a light-emitting object that may emit isotropic beams to the surroundings.

In this case, since the first region 151 is provided with the laser diffusion portion 1051 therein, and the laser beam is reflected by the first region 151 and diffused by the laser diffusion portion 1051 after being incident on the first region 151, an exiting angle of the laser beam reflected by the first region 151 is greater than an incident angle thereof. In this way, the laser beam reflected and diffused by the first region 151 may exit to the first lens 104 at a large angle, and a beam spot provided by the laser beam may substantially cover the surface of the first lens 104 proximate to the phosphor wheel 105.

In this way, a size of a beam spot formed on the first lens 104 by the fluorescent beam emitted by the phosphor wheel 105 is substantially the same as a size of a beam spot formed on the first lens 104 by the laser beam diffused and reflected by the phosphor wheel 105. The beam spot formed on the first lens 104 by the fluorescent beam emitted by the phosphor wheel 105 may substantially coincide with the beam spot formed on the first lens 104 by the laser beam diffused and reflected by the phosphor wheel 105. As a result, a difference between the size of the beam spot formed by the laser beam reflected by the first region 151 and the size of the beam spot formed by the fluorescent beam emitted by the second region 152 is reduced, and an overlapping degree of optical axes of the laser beam and the fluorescent beam, and an overlapping degree of the beam spots of the laser beam and the fluorescent beam are improved, and the uniformity of color and luminance of the beam spot formed by the laser beam and the fluorescent beam after combination is improved, and the display effect of the projection image is improved.

In some embodiments, the second region 152 may be provided with at least one of green fluorescent material, red fluorescent material, or yellow fluorescent material. For example, the green fluorescent material may emit green fluorescent beam due to excitation of the laser beam, the red fluorescent material emit red fluorescent beam due to excitation of the laser beam, and the yellow fluorescent material emit yellow fluorescent beam due to excitation of the laser beam. Of course, the fluorescent beam emitted by the phosphor wheel 105 may have other colors.

In some embodiments, the second region 152 includes a fluorescence sub-region, each fluorescence sub-region is provided with a fluorescent material of one color.

In some embodiments, the second region 152 includes a plurality of fluorescence sub-regions. For example, as shown in FIG. 12, the second region 152 includes a first fluorescence sub-region 1521 and a second fluorescence sub-region 1522. One of the first fluorescence sub-region 1521 and the second fluorescence sub-region 1522 is provided with red fluorescent material, and another of the first fluorescence sub-region 1521 and the second fluorescence sub-region 1522 is provided with green fluorescent material. Alternatively, one of the two fluorescence sub-regions may be provided with green fluorescent material, and another of the two fluorescence sub-regions may be provided with yellow fluorescent material. Alternatively, one of the two fluorescence sub-regions may be provided with green fluorescent material, and another of the two fluorescence sub-regions may be provided with orange fluorescent material.

In some embodiments of the present disclosure, the description is given by taking an example in which areas of the plurality of fluorescence sub-regions of the second region 152 are equal to each other, and an area of the first region 151 is also equal to the area of any one of the fluorescence sub-regions. However, the areas of each of the plurality of fluorescence sub-regions and the first region 151 may also be different from each other, and the areas of each of the plurality of fluorescence sub-regions and the first region 151 each may be designed according to a proportion of the laser beam or fluorescent beam of the corresponding color in the white beams to be obtained. For example, in a case where the laser device 101 emits a blue laser beam, the first fluorescence sub-region 1521 adopts red fluorescent material, the second fluorescence sub-region 1522 adopts green fluorescent material, and a rotational speed of the phosphor wheel 105 is constant, if the white beams can be obtained by mixing the blue laser beam, the red fluorescent beam and the green fluorescent beam in a ratio of 1:2:1, the area of the first region 151 is equal to an area of the second fluorescence sub-region 1522, and the area of the second fluorescence sub-region 1522 is half of an area of the first fluorescence sub-region 1521.

It will be noted that, in a case where the light-emitting chips in the laser device 101 emit the laser beams at different times, the light-emitting time of different light-emitting chips may be determined according to a switching timing of the first region 151 and the second region 152 of the phosphor wheel 105. For example, laser beams emitted by the first light-emitting chips are incident on the first region 151, and laser beams emitted by the second light-emitting chips are incident on the second region 152. Moreover, the second light-emitting chips may further include a plurality of light-emitting sub-chips, and the plurality of light-emitting sub-chips correspond to the plurality of fluorescence sub-regions of the second region 152. In addition, the number of the first light-emitting chips may be the same as or different from the number of the second light-emitting chips.

Figure 15:
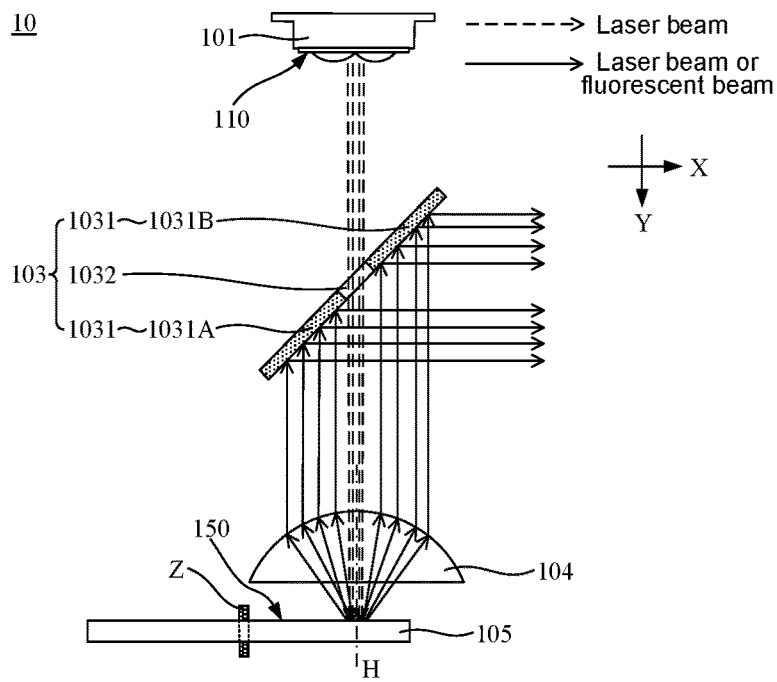
FIG. 15 is a diagram showing a structure of yet another laser source, in accordance with some embodiments.
Figure 16:
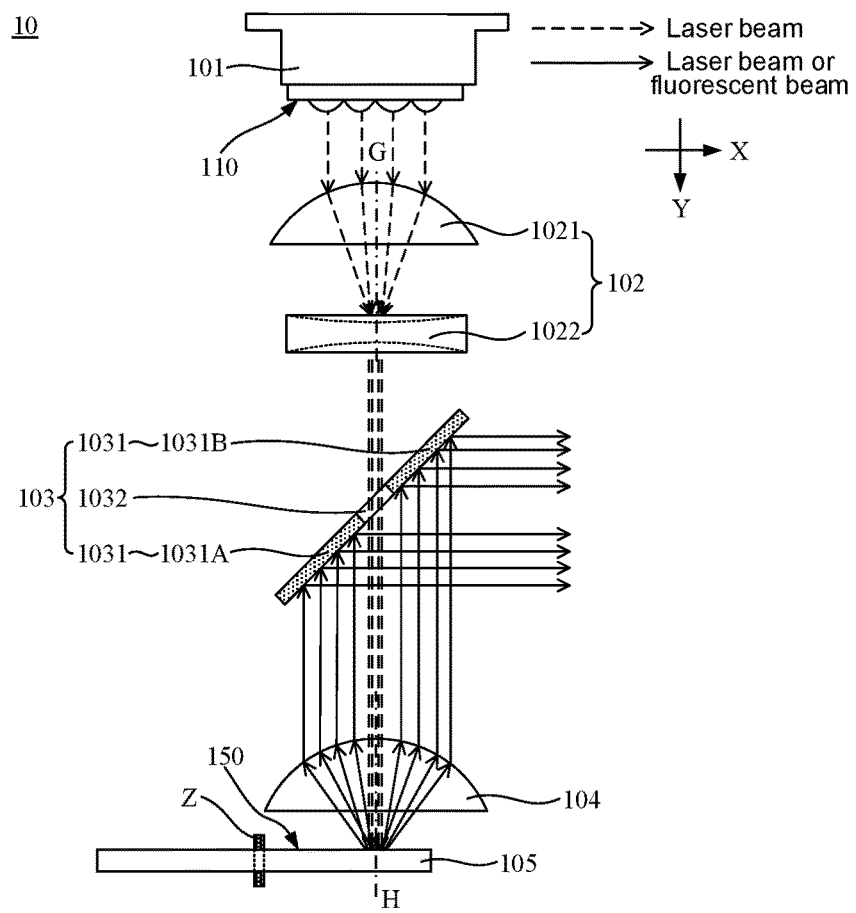
FIG. 16 is a diagram showing a structure of yet another laser source, in accordance with some embodiments.

FIG. 15 is a diagram showing a structure of yet another laser source, in accordance with some embodiments. FIG. 16 is a diagram showing a structure of yet another laser source, in accordance with some embodiments. FIG. 17 is a diagram showing a structure of yet another laser source, in accordance with some embodiments.

The above description is given mainly by taking an example in which the combining component 103 includes the plurality of reflecting regions 1031 and the plurality of transmitting regions 1032. However, in some embodiments, as shown in FIGS. 15 to 17, the combining component 103 may also include one transmitting region 1032 and two reflecting regions 1031, and the two reflecting regions 1031 are located on two sides of the transmitting region 1032 respectively.

For example, the combining component 103 includes one transmitting region 1032, the two reflecting regions 1031 are a first reflecting region 1031A and a second reflecting region 1031B. The first reflecting region 1031A is located on a side of the transmitting region 1032 away from the laser device 101, and the second reflecting region 1031B is located on a side of the transmitting region 1032 proximate to the laser device 101. A laser beam emitted by the laser device 101 is incident on the transmitting region 1032, and is incident on the first lens 104 after passing through the transmitting region 1032.

In this case, the laser beam transmitted by the transmitting region 1032 may pass through the optical axis H of the first lens 104. For example, the beam spot formed on the first lens 104 by the laser beam is symmetrical with respect to the optical axis H of the first lens 104. Since the first region 151 of the phosphor wheel 105 may diffuse and reflect the laser beam incident on the first region 151, even if the laser beam transmitted through the transmitting region 1032 is incident on the phosphor wheel 105 along the optical axis H of the first lens 104, the laser beam reflected by the phosphor wheel 105 will not be incident on the transmitting region 1032 along a direction of the optical axis H of the first lens 104, so as to avoid the waste of the laser beam.

Figure 18:
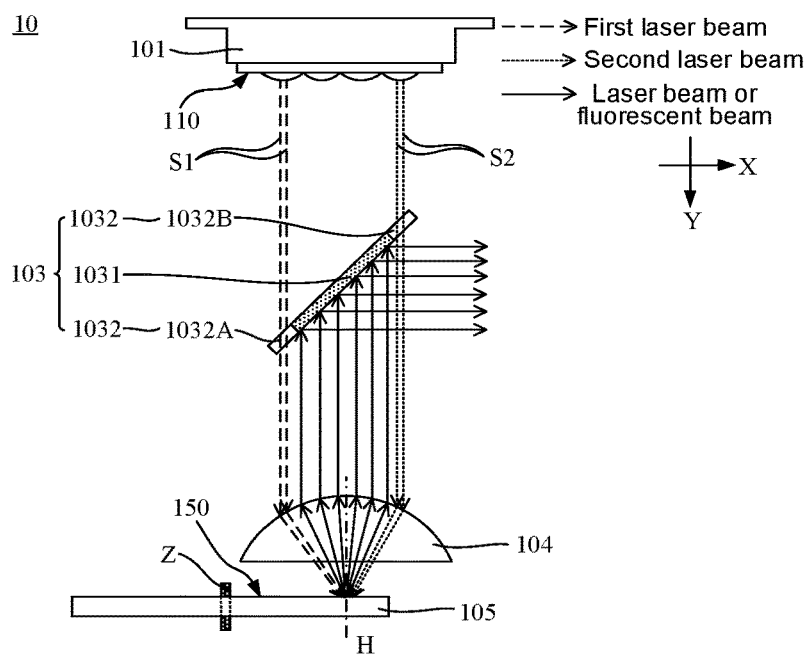
FIG. 18 is a diagram showing a structure of yet another laser source, in accordance with some embodiments.
Figure 19:
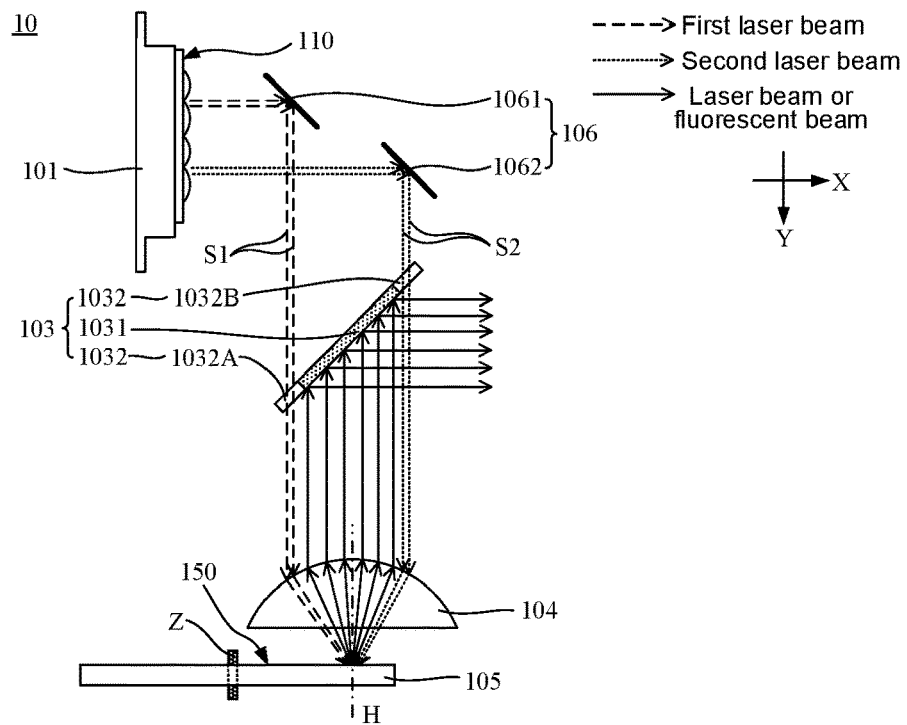
FIG. 19 is a diagram showing a structure of yet another laser source, in accordance with some embodiments.
Figure 20:
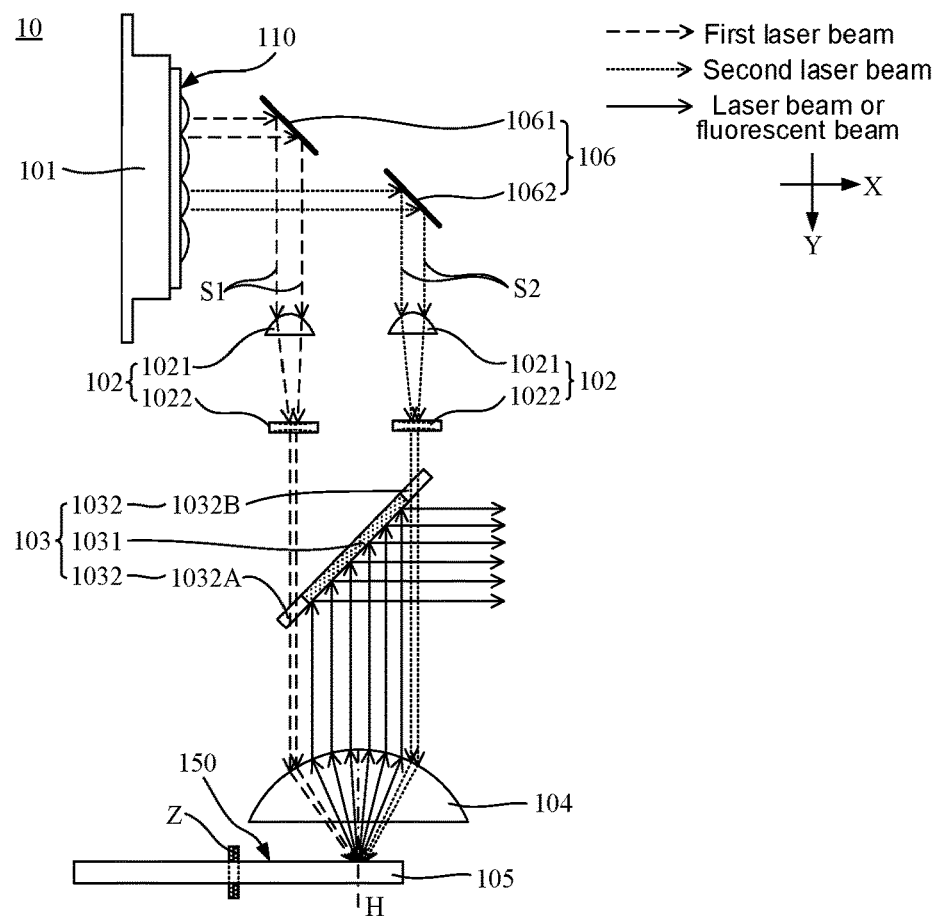
FIG. 20 is a diagram showing a structure of yet another laser source, in accordance with some embodiments.

FIG. 18 is a diagram showing a structure of yet another laser source, in accordance with some embodiments. FIG. 19 is a diagram showing a structure of yet another laser source, in accordance with some embodiments. FIG. 20 is a diagram showing a structure of yet another laser source, in accordance with some embodiments.

Of course, in some embodiments, the combining component 103 may also include one reflecting region 1031 and two transmitting regions 1032, and the two transmitting regions 1032 are located on two sides of the reflecting region 1031 respectively.

For example, as shown in FIGS. 18 to 20, the combining component 103 includes one reflecting region 1031, the two transmitting regions 1032 are a first transmitting region 1032A and a second transmitting region 1032B. The first transmitting region 1032A is located on a side of the reflecting region 1031 away from the laser device 101, and the second transmitting region 1032B is located on a side of the reflecting region 1031 proximate to the laser device 101. The first laser beam S1 emitted by the laser device 101 is incident on the first lens 104 after being transmitted through the first transmitting region 1032A, and the second laser beam S2 emitted from the laser device 101 is incident on the first lens 104 after being transmitted through the second transmitting region 1032B.

It will be noted that, since the first region 151 of the phosphor wheel 105 may diffuse and reflect the laser beams transmitted through the transmitting regions 1032, beam spots formed on the first lens 104 by the two laser beams exiting from the two transmitting regions 1032 may be symmetrical with respect to the optical axis H of the first lens 104.

For example, as shown in FIG. 18, the first laser beam S1 and the second laser beam S2 emitted by the laser device 101 are incident on the first transmitting region 1032A and the second transmitting region 1032B respectively. The first laser beam S1 is incident on the first lens 104 after being transmitted through the first transmitting region 1032A, and the second laser beam S2 is incident on the first lens 104 after being transmitted through the second transmitting region 1032B. The beam spot formed on the first lens 104 by the first laser beam S1 and the beam spot formed on the first lens 104 by the second laser beam S2 are symmetrical with respect to the optical axis H of the first lens 104. That is, a position of the first lens 104 where the first laser beam S1 irradiates on and a position of the first lens 104 where the second laser beam S2 irradiates on are symmetrical with respect to the optical axis H of the first lens 104.

In some embodiments of the present disclosure, the first region 151 and the second region 152 of the phosphor wheel 105 each emit light (e.g., the fluorescent beam or the laser beam) in various directions in a form of Lambert body, and the energy of a middle portion of the beam formed by the light is greater than the energy of an edge portion of the beam formed by the light. For example, in a beam formed by the light exiting from the phosphor wheel 105, a luminous intensity of a middle portion of the beam is greater than a luminous intensity of an edge portion of the beam.

In this case, since the two transmitting regions 1032 of the combining component 103 are located on two sides of the reflecting region 1031 respectively, when the light exiting from the phosphor wheel 105 is incident on the combining component 103, a large portion of the light is incident on the reflecting region 1031, and a small portion of the light is incident on the two transmitting regions 1032. In this way, in all light exiting from the phosphor wheel 105, the proportion of the light transmitted through the transmitting region 1032 of the all light exiting from the phosphor wheel 105 is small, so that the laser source 10 has less light loss. Thus, even if the edge portion of the light exiting from the phosphor wheel 105 cannot be propagated to the subsequent beam path due to the transmission of transmitting region 1032, the display effect of the projection image will not be affected.

Figure 14:
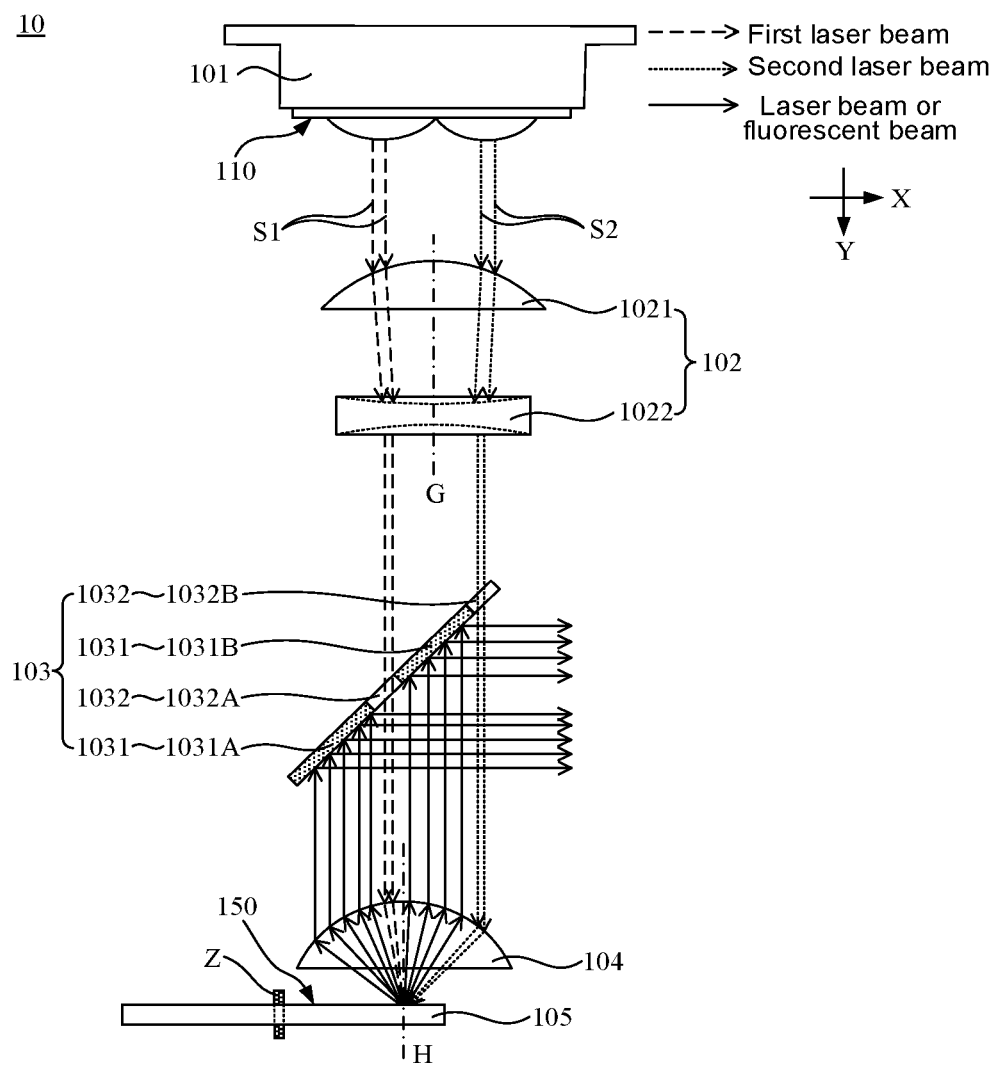
FIG. 14 is a diagram showing a structure of yet another laser source, in accordance with some embodiments.

In some embodiments, as shown in FIGS. 14, 16 and 20, the laser source 10 further includes a second lens group 102. The second lens group 102 is located between the laser device 101 and the combining component 103, and the second lens group 102 is configured to contract a beam spot of the laser beam incident on the second lens group 102. That is to say, the second lens group 102 may make a beam of the laser beam exiting from the second lens group 102 thinner than a beam of the laser beam incident on the second lens 102. It will be noted that, although the second lens group 102 is shown in FIGS. 14, 16, and 20, the second lens group 102 is optional and may be omitted in some embodiments of the present disclosure. That is to say, in some embodiments, the laser source 10 does not include the second lens group 102.

In some embodiments, as shown in FIG. 16, the laser source 10 includes one second lenses group 102. The one second lens group 102 includes a first sub-lens 1021 and a second sub-lens 1022, the first sub-lens 1021 is closer to the laser device 101 than the second sub-lens 1022. For example, the first sub-lens 1021 is a convex lens, and the second sub-lens 1022 is a concave lens. The first sub-lens 1021 and the second sub-lens 1022 are sequentially arranged along the second direction Y, and an optical axis of the first sub-lens 1021 and an optical axis of the second sub-lens 1022 may be collinear. In this way, the second lens group 102 may first converge the laser beam emitted by the laser device 101 and then diverge the converged laser beam, and after the laser beam emitted by the laser device 101 is incident on the second lens group 102 in the form of approximately parallel beam, the laser beam may still exit from the second lens group 102 to the combining component 103 in the form of approximately parallel beam. For example, the second lens group 102 is a telescope system with a high magnification, which may contract the laser beam to a great extent.

In some embodiments, the laser source 10 may include a plurality of second lens groups 102. The plurality of second lens groups 102 correspond to the plurality of transmitting regions 1032.

For example, as shown in FIG. 20, the laser source 10 includes two second lens groups 102. The two second lens groups 102 are located between the mirror group 106 and the combining component 103, and the two second lens groups 102 may correspond to the two transmitting regions 1032 of the combining component 103, so as to contract the two laser beams to be incident on the two transmitting regions 1032 respectively.

In some embodiments, as shown in FIG. 14 and FIG. 17, the laser beams emitting from the laser device 101 or reflected by the mirror group 106 may be symmetrical with respect to an optical axis G of the second lens group 102, so that the second lens group 102 may contract the laser beams incident thereon to a same extent.

It will be noted that, the optical axis G of the second lens group 102 and the optical axis H of the first lens 104 may be non-collinear. Alternatively, the optical axis G of the second lens group 102 and the optical axis H of the first lens 104 may also be collinear, and the present disclosure is not limited thereto. In addition, the second lens group 102 may make the beam of the laser beam exiting from the second lens group 102 thinner than the beam of the laser beam incident on the second lens group 102. Therefore, a size of the transmitting region 1032 of the combining component 103 may be small. As a result, it is possible to reduce the loss of the laser beam, increase the utilization rate of the laser beam, and it is conducive to reducing a size of the combining component 103 and the miniaturization of the laser source 10.

In some embodiments, the plurality of second lens groups 102, the plurality of mirrors, and the plurality of transmitting regions 1032 correspond to each other, so that the laser beam exiting from each mirror is incident on the corresponding transmitting region 1032 after being contracted by the corresponding second lens group 102.

For example, as shown in FIG. 20, the mirror group 106 includes two mirrors, the laser source 10 includes two second lens groups 102, and the combining component 103 includes two transmitting regions 1032. The laser beam emitted by the laser device 101 are split into the first laser beam S1 and the second laser beam S2 by the mirror group 106. The first laser beam S1 is incident on the first transmitting region 1032A after passing through the corresponding second lens group 102, and is incident on the first lens 104 after being transmitted through the first transmitting region 1032A. The second laser beam S2 is incident on the second transmitting region 1032B after passing through the corresponding second lens group 102, and is incident on the first lens 104 after being transmitted through the second transmitting region 1032B.

In some embodiments of the present disclosure, by providing the plurality of second lens groups 102 separately, it is possible to reduce a difference between contracting effects of the second lens groups 102 on the plurality of laser beams, and improve the contracting effects of the second lens groups 102 on the plurality of laser beams. Moreover, even if one of the second lens groups 102 is damaged, the other second lens groups 102 may still function properly, which may reduce the risk of the laser source 10 becoming unusable due to damage of the second lens group 102.

Figure 21:
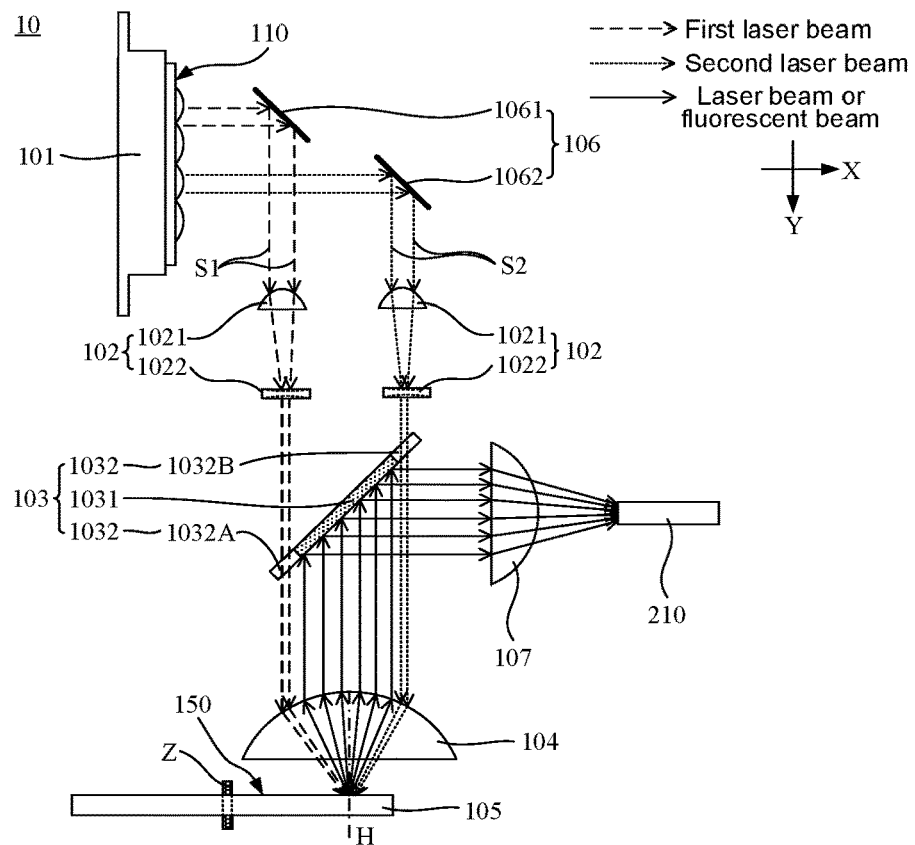
FIG. 21 is a diagram showing a structure of yet another laser source, in accordance with some embodiments.
Figure 22:
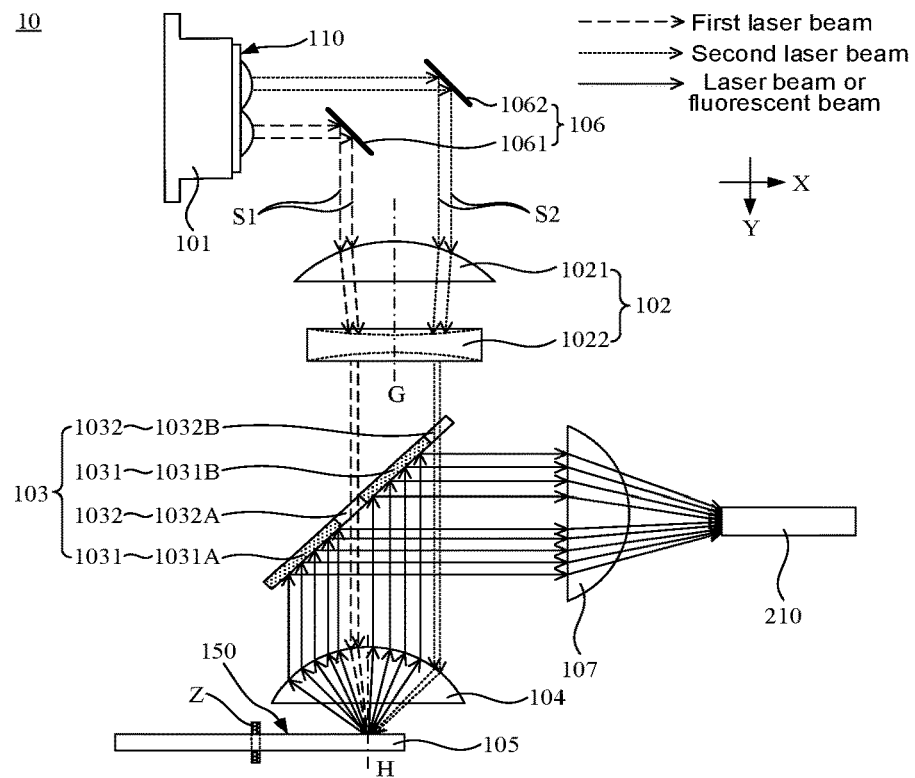
FIG. 22 is a diagram showing a structure of yet another laser source, in accordance with some embodiments.

FIG. 21 is a diagram showing a structure of yet another laser source, in accordance with some embodiments. FIG. 22 is a diagram showing a structure of yet another laser source, in accordance with some embodiments.

In some embodiments, as shown in FIGS. 21 and 22, the laser source 10 further includes a third lens 107. The combining component 103 and the third lens 107 are arranged along the first direction X. The third lens 107 is configured to converge the laser beam and the fluorescent beam reflected by the combining component 103 to the light pipe 210. It will be noted that, FIGS. 21 and 22 are illustrated by taking an example in which the laser source 10 includes one third lens 107. However, the present disclosure is not limited thereto.

In some embodiments of the present disclosure, by providing the combining component 103 with the transmitting region 1032 and the reflecting region 1031, there is no need to provide the laser-transmitting region of the phosphor wheel 105 and the relay loop matched with the laser-transmitting region, it is possible to make optical elements of the laser source 10 small, to make the beam path architecture compact, not only to enable the laser source 10 to have a high luminous power, but also to reduce the volume of the laser source 10 and facilitate the miniaturization of the laser projection apparatus 1.

Moreover, by providing the laser diffusion portion 1051 in the first region 151 of the phosphor wheel 105, it is possible to increase a divergence angle of the laser beam reflected by the phosphor wheel 105, and make the divergence angle of the reflected laser beam substantially the same as a divergence angle of the fluorescent beam emitted by the phosphor wheel 105. As a result, it is possible to reduce the difference between the size of the beam spot of the laser beam reflected by the phosphor wheel 105 and the size of the beam spot of the fluorescent beam emitted by the phosphor wheel 105, improve the overlapping degree of the optical axes of the laser beam and the fluorescent beam, improve the overlapping degree of the beam spots of the laser beam and the fluorescent beam, and improve the uniformity of the color and luminance of the beam spot formed by the laser beam and the fluorescent beam after combination, and improve the display effect of the projection image.

In addition, a large portion of the laser beam and the fluorescent beam from the phosphor wheel 105 may be incident on the reflecting region 1031 of the combining component 103, which reduces the loss of the laser beam and the fluorescent beam in the laser source 10 and increase the utilization rate of the laser beam and the fluorescent beam.

A person skilled in the art will understand that, the scope of disclosure in the present disclosure is not limited to specific embodiments discussed above, and may modify and substitute some elements of the embodiments without departing from the spirits of this application. The scope of the application is limited by the appended claims.

What is claimed is:

1. A laser projection apparatus, comprising:
a laser source configured to emit illumination beams;
a light modulating engine configured to modulate the illumination beams, so as to obtain projection beams; and
a projection lens configured to project the projection beams into an image;
the laser source including:
  a laser device configured to emit a plurality of laser beams;
  a combining component located on a laser-exit beam path of the laser device and disposed obliquely with respect to a laser-exit direction of the laser device, the combining component including:
    a reflecting region configured to reflect a laser beam and a fluorescent beam incident on the reflecting region; and
    two transmitting regions respectively disposed at two sides of the reflecting region, the transmitting regions being configured to transmit the plurality of laser beams emitted by the laser device;
  a first lens located on a side of the combining component away from the laser device, the first lens being configured to converge the laser beams transmitted by the transmitting regions; and
  a phosphor wheel located on a side of the first lens away from the combining component, the phosphor wheel including:
    a first region configured to diffuse and reflect the laser beams converged by the first lens; and
    a second region configured to be excited to emit a fluorescent beam due to irradiation of the laser beams converged by the first lens; wherein
  with a rotation of the phosphor wheel, when the laser beams converged by the first lens are incident on the first region, the first region diffuses and reflects the laser beams incident on the first region, and the laser beam reflected by the first region is incident on the reflecting region of the combining component after passing through the first lens; when the laser beams converged by the first lens are incident on the second region, the second region emits the fluorescent beam due to excitation of the laser beams incident on the second region, and the fluorescent beam is incident on the reflecting region of the combining component after passing through the first lens, and the reflecting region of the combining component reflects the laser beam and the fluorescent beam from the phosphor wheel to a beam outlet of the laser source, so as to be the illumination beams of the laser source.

2. The laser projection apparatus according to claim 1, wherein
beam spots provided by the fluorescent beam emitted by the phosphor wheel and the laser beam reflected by the phosphor wheel substantially cover a surface of the first lens proximate to the phosphor wheel.

3. The laser projection apparatus according to claim 1, wherein the phosphor wheel further includes:
a first substrate, the first region and the second region each being located on a surface of the first substrate proximate to the laser device, and the first region and the second region being enclosed to be a closed-loop; and
a laser diffusion portion located in the first region, the laser diffusion portion being configured to diffuse the laser beams incident on the first region, so as to increase a divergence angle of the laser beams.

4. The laser projection apparatus according to claim 3, wherein the laser diffusion portion includes a component with a rough surface.

5. The laser projection apparatus according to claim 1, wherein an area of each of the two transmitting regions is less than an area of the reflecting region.

6. The laser projection apparatus according to claim 5, wherein the area of each of the transmitting regions is less than or equal to one-fourth of the area of the reflecting region.

7. The laser projection apparatus according to claim 1, wherein a laser-exit surface of the laser device is perpendicular to a laser-receiving surface of the phosphor wheel, and the laser source further includes:
a mirror group located on a laser-exit side of the laser device, the mirror group includes:
  a plurality of mirrors, the plurality of mirrors being configured to split the plurality of laser beams emitted by the laser device into two or more laser beams and reflect the two or more laser beams to the two transmitting regions, distances between each of the plurality of mirrors and the laser-exit surface of the laser device being different from each other, and in any two of the plurality of mirrors, at least a portion of an orthogonal projection of one mirror on the laser-exit surface of the laser device does not overlapping with at least a portion of an orthogonal projection of another mirror on the laser-exit surface of the laser device.

8. The laser projection apparatus according to claim 1, wherein the combining component satisfies one of the following:
the combining component includes:
  a second substrate; and
  an anti-reflection film disposed on at least a portion of a surface of the second substrate proximate to the laser device, the anti-reflection film being configured to increase a transmittance of the laser beams incident on the anti-reflection film;
or
the combining component includes:
  a second substrate; and
  a light diffusion structure disposed on a surface of the second substrate proximate to the laser device, the light diffusion structure being configured to diffuse the laser beams incident on the combining component, so as to increase a divergence angle of the laser beams;
or
the combining component includes:
  a reflecting portion located in the reflecting region, the reflecting portion being configured to reflect the laser beam and the fluorescent beam incident on the reflecting portion; and
  a transmitting portion located in the transmitting region, the transmitting portion being configured to transmit the plurality of laser beams emitted by the laser device and reflect the fluorescent beam emitted by the phosphor wheel.

9. The laser projection apparatus according to claim 1, wherein the laser source further includes:
two second lens groups located between the laser device and the combining component, and the second lens groups being configured to contract beam spots of the laser beams emitted by the laser device; wherein
the two second lens groups correspond to the two transmitting regions, so as to make the laser beams emitted by the laser device be incident on the corresponding transmitting regions after passing through the second lens groups.

10. A laser projection apparatus, comprising:
a laser source configured to emit illumination beams;
a light modulating engine configured to modulate the illumination beams, so as to obtain projection beams; and
a projection lens configured to project the projection beams into an image;
the laser source including:
a laser device configured to emit a plurality of laser beams;
a combining component located on a laser-exit beam path of the laser device and disposed obliquely with respect to a laser-exit direction of the laser device, the combining component including:
a plurality of reflecting regions configured to reflect a laser beam and a fluorescent beam incident on the reflecting regions; and
a plurality of transmitting regions configured to transmit the plurality of laser beams emitted by the laser device, the plurality of transmitting regions and the plurality of reflecting regions being alternately arranged;
a first lens located on a side of the combining component away from the laser device, the first lens being configured to converge the plurality of laser beams transmitted by the plurality of transmitting regions, beam spots provided on the first lens by any two of the plurality of laser beams being asymmetric with respect to an optical axis of the first lens; and
a phosphor wheel located on a side of the first lens away from the combining component, the phosphor wheel including:
a first region configured to diffuse and reflect the laser beams converged by the first lens; and
a second region configured to be excited to emit a fluorescent beam due to irradiation of the laser beams converged by the first lens; wherein
with a rotation of the phosphor wheel, when the laser beams converged by the first lens are incident on the first region, the first region diffuses and reflects the laser beams incident on the first region, and the laser beam reflected by the first region is incident on the plurality of reflecting regions of the combining component after passing through the first lens; when the laser beams converged by the first lens are incident on the second region, the second region emits the fluorescent beam due to excitation of the laser beams incident on the second region, and the fluorescent beam is incident on the plurality of reflecting regions of the combining component after passing through the first lens, and the plurality of reflecting regions of the combining component reflect the laser beam and the fluorescent beam from the phosphor wheel to a beam outlet of the laser source, so as to be the illumination beams of the laser source.

11. The laser projection apparatus according to claim 10, wherein
beam spots provided by the fluorescent beam emitted by the phosphor wheel and the laser beam reflected by the phosphor wheel substantially cover a surface of the first lens proximate to the phosphor wheel.

12. The laser projection apparatus according to claim 10, wherein the phosphor wheel further includes:
a first substrate, the first region and the second region each being located on a surface of the first substrate proximate to the laser device, and the first region and the second region being enclosed to be a closed loop shape; and
a laser diffusion portion located in the first region, the laser diffusion portion being configured to diffuse the laser beams incident on the first region, so as to increase a divergence angle of the laser beams.

13. The laser projection apparatus according to claim 10, wherein an area of each of the plurality of transmitting regions is less than an area of each of the plurality of reflecting regions.

14. The laser projection apparatus according to claim 13, wherein the area of each of the transmitting regions is less than or equal to one-fourth of the area of each of the reflecting regions.

15. The laser projection apparatus according to claim 10, wherein a laser-exit surface of the laser device is perpendicular to a laser-receiving surface of the phosphor wheel, and the laser source further includes:
a mirror group located on a laser-exit side of the laser device, the mirror group includes:
a plurality of mirrors corresponding to the plurality of transmitting regions, the plurality of mirrors being configured to split the plurality of laser beams emitted by the laser device into two or more laser beams, and reflect the two or more laser beams to the plurality of transmitting regions, distances between each of the plurality of mirrors and the laser-exit surface of the laser device being different from each other, and in any two of the plurality of mirrors, at least a portion of an orthogonal projection of one mirror on the laser-exit surface of the laser device does not overlapping with at least a portion of an orthogonal projection of another mirror on the laser-exit surface of the laser device.

16. The laser projection apparatus according to claim 10, wherein the combining component satisfies one of the following:
the combining component includes:
a second substrate; and
an anti-reflection film disposed on at least a portion of a surface of the second substrate proximate to the laser device, the anti-reflection film being configured to increase a transmittance of the laser beams incident on the anti-reflection film;
or
the combining component includes:
a second substrate; and
a light diffusion structure disposed on a surface of the second substrate proximate to the laser device, the light diffusion structure being configured to diffuse the laser beams incident on the combining component, so as to increase a divergence angle of the laser beams;

or the combining component includes:
- a reflecting portion located in the reflecting region, the reflecting portion being configured to reflect the laser beam and the fluorescent beam incident on the reflecting portion; and
- a transmitting portion located in the transmitting region, the transmitting portion being configured to transmit the laser beams emitted by the laser device and reflect the fluorescent beam emitted by the phosphor wheel.

17. The laser projection apparatus according to claim 10, wherein the laser source further includes:
a second lens group located between the laser device and the combining component, the second lens group being configured to contract beam spots of the laser beams emitted by the laser device, at least two of the laser beams incident on the second lens being symmetrical with respect to an optical axis of the second lens.

18. A laser projection apparatus, comprising:
a laser source configured to emit illumination beams;
a light modulating engine configured to modulate the illumination beams, so as to obtain projection beams; and
a projection lens configured to project the projection beams into an image;
the laser source including:
- a laser device configured to emit a laser beam;
- a combining component located on a laser-exit beam path of the laser device and disposed obliquely with respect to a laser-exit direction of the laser device, the combining component including:
  - two reflecting regions configured to reflect a laser beam and a fluorescent beam incident on the reflecting regions; and
  - a transmitting region disposed between the two reflecting regions, the transmitting region being configured to transmit the laser beam emitted by the laser device;
- a first lens located on a side of the combining component away from the laser device, the first lens being configured to converge the laser beam transmitted by the transmitting region, and the laser beam emitted by the laser device passing through an optical axis of the first lens; and
- a phosphor wheel located on a side of the first lens away from the combining component, the phosphor wheel including:
  - a first region configured to diffuse and reflect the laser beam converged by the first lens; and
  - a second region configured to be excited to emit a fluorescent beam due to irradiation of the laser beams converged by the first lens; wherein
  with a rotation of the phosphor wheel, when the laser beam converged by the first lens is incident on the first region, the first region diffuses and reflects the laser beam incident on the first region, and the laser beam reflected by the first region is incident on the two reflecting regions of the combining component after passing through the first lens;

when the laser beam converged by the first lens is incident on the second region, the second region emits the fluorescent beam due to excitation of the laser beam incident on the second region, and the fluorescent beam is incident on the two reflecting regions of the combining component after passing through the first lens, and the two reflecting regions of the combining component reflect the laser beam and the fluorescent beam from the phosphor wheel to a beam outlet of the laser source, so as to be the illumination beams of the laser source.

19. The laser projection apparatus according to claim 18, wherein
beam spots provided by the fluorescent beam emitted by the phosphor wheel and the laser beam reflected by the phosphor wheel substantially cover a surface of the first lens proximate to the phosphor wheel.

20. The laser projection apparatus according to claim 18, wherein a laser-exit surface of the laser device is perpendicular to a laser-receiving surface of the phosphor wheel, and the laser source further includes:
a mirror group located on a laser-exit side of the laser device, the mirror group includes:
one mirror configured to change a propagation direction of the laser beam emitted by the laser device, so as to make the laser beam emitted by the laser device be incident on the corresponding transmitting region.

* * * * *